United States Patent
Nozato et al.

(10) Patent No.: US 9,711,786 B2
(45) Date of Patent: Jul. 18, 2017

(54) FINE PARTICLE-EXFOLIATED GRAPHITE COMPOSITE, NEGATIVE ELECTRODE MATERIAL FOR LITHIUM ION SECONDARY BATTERY, AND METHODS FOR PRODUCING THE SAME, AND LITHIUM ION SECONDARY BATTERY

(71) Applicant: SEKISUI CHEMICAL CO., LTD., Osaka, Osaka (JP)

(72) Inventors: Shoji Nozato, Osaka (JP); Akira Nakasuga, Osaka (JP); Akihiko Fujiwara, Osaka (JP); Hiroshi Yoshitani, Osaka (JP); Yasushi Uematsu, Shiga (JP); Shotaro Kobaru, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 15 days.

(21) Appl. No.: 14/433,842

(22) PCT Filed: Feb. 25, 2014

(86) PCT No.: PCT/JP2014/054444
§ 371 (c)(1),
(2) Date: Apr. 6, 2015

(87) PCT Pub. No.: WO2014/136609
PCT Pub. Date: Sep. 12, 2014

(65) Prior Publication Data
US 2015/0270534 A1 Sep. 24, 2015

(30) Foreign Application Priority Data
Mar. 4, 2013 (JP) .................................. 2013-041737

(51) Int. Cl.
*B82Y 30/00* (2011.01)
*H01M 4/36* (2006.01)
(Continued)

(52) U.S. Cl.
CPC ........... *H01M 4/364* (2013.01); *H01M 4/133* (2013.01); *H01M 4/1393* (2013.01);
(Continued)

(58) Field of Classification Search
CPC ........... H01M 2004/027; H01M 4/133; H01M 4/1393; H01M 4/364; H01M 4/366;
(Continued)

(56) References Cited

U.S. PATENT DOCUMENTS

| 2009/0117466 A1 | 5/2009 | Zhamu et al. | |
| 2010/0183911 A1* | 7/2010 | Ishikawa | B23D 21/14 429/164 |

(Continued)

FOREIGN PATENT DOCUMENTS

| JP | 2009-129914 A | 6/2009 |
| JP | 2009-146581 A | 7/2009 |

(Continued)

OTHER PUBLICATIONS

Written Opinion of the International Searching Authority (PCT/ISA/237 for Application No. PCT/JP2014/054444 mailed May 13, 2014 (English Translation mailed Sep. 17, 2015).

(Continued)

*Primary Examiner* — Patrick Ryan
*Assistant Examiner* — Ben Lewis
(74) *Attorney, Agent, or Firm* — Cheng Law Group, PLLC

(57) ABSTRACT

There is provided a method for producing a negative electrode material for lithium ion secondary batteries that is easily produced and is less likely to cause deterioration in (Continued)

charge and discharge cycle characteristics. A method for producing a negative electrode material for lithium ion secondary batteries, comprises steps of heating a raw material composition comprising resin-retained partially exfoliated graphite having a structure in which graphene is partially exfoliated and Si particles to dope the partially exfoliated graphite with the Si particles, the partially exfoliated graphite being obtained by pyrolyzing a resin in a composition in which the resin is fixed to graphite or primary exfoliated graphite, thereby exfoliating the graphite or primary exfoliated graphite while allowing part of the above resin to remain; providing a composition comprising the above partially exfoliated graphite doped with the Si particles, a binder resin, and a solvent; and shaping the above composition.

21 Claims, 12 Drawing Sheets

(51) Int. Cl.
H01M 4/133 (2010.01)
H01M 4/1393 (2010.01)
H01M 4/38 (2006.01)
H01M 4/587 (2010.01)
H01M 4/62 (2006.01)
H01M 4/1395 (2010.01)
H01M 4/02 (2006.01)

(52) U.S. Cl.
CPC ......... H01M 4/1395 (2013.01); H01M 4/366 (2013.01); H01M 4/38 (2013.01); H01M 4/386 (2013.01); H01M 4/587 (2013.01); H01M 4/622 (2013.01); H01M 4/623 (2013.01); H01M 4/624 (2013.01); H01M 4/625 (2013.01); H01M 2004/027 (2013.01)

(58) Field of Classification Search
CPC ........ H01M 4/38; H01M 4/587; H01M 4/622; H01M 4/623; H01M 4/624; H01M 4/625; Y02E 60/122
See application file for complete search history.

(56) References Cited

U.S. PATENT DOCUMENTS

| | | | |
|---|---|---|---|
| 2011/0003210 A1* | 1/2011 | Lim ................. | B01D 67/009 429/249 |
| 2011/0165466 A1* | 7/2011 | Zhamu .................. | B82Y 30/00 429/231.8 |
| 2011/0278506 A1 | 11/2011 | Toyokawa | |
| 2011/0294013 A1* | 12/2011 | Bosnyak ................ | B82Y 30/00 429/231.1 |
| 2013/0209881 A1* | 8/2013 | Do ........................ | H01M 4/134 429/213 |
| 2013/0266858 A1 | 10/2013 | Inoue et al. | |
| 2013/0296498 A1 | 11/2013 | Nakasuga et al. | |

FOREIGN PATENT DOCUMENTS

| | | |
|---|---|---|
| JP | 2011-57541 A | 3/2011 |
| JP | 2011-219318 A | 11/2011 |
| JP | 2013-232403 A | 11/2013 |
| WO | WO 2012/087698 A1 | 6/2012 |
| WO | WO-2012/105344 A1 | 8/2012 |

OTHER PUBLICATIONS

International Search Report for the Application No. PCT/JP2014/054444 mailed May 13, 2014.

Written Opinion of the International Searching Authority (PCT/ISA/237) for Application No. PCT/JP2014/054444 mailed May 13, 2014.

Supplementary European Search Report for the Application No. EP 14 76 0126 dated Aug. 9, 2016.

Chen, X. et al., "Preparation and structure analysis of carbon/carbon composite made from phenolic resin impregnation into exfoliated graphite.", Journal of Physics and Chemistry of Solids, 2006, vol. 67, pp. 1141-1144.

Cui, Li-Feng et al., "Light-Weight Free-Standing Carbon Nanotube-Silicon Films for Anodes of Lithium Ion Batteries", ACS NANO, 2010, vol. 4, No. 7, pp. 3671-3678.

* cited by examiner

FINE PARTICLE-EXFOLIATED GRAPHITE COMPOSITE, NEGATIVE ELECTRODE MATERIAL FOR LITHIUM ION SECONDARY BATTERY, AND METHODS FOR PRODUCING THE SAME, AND LITHIUM ION SECONDARY BATTERY

TECHNICAL FIELD

The present invention relates to a fine particle-exfoliated graphite composite, a negative electrode material used in a lithium ion secondary battery, and methods for producing the same, and more particularly to a fine particle-exfoliated graphite composite comprising a carbon material in which fine particles are included, a negative electrode material for lithium ion secondary batteries, and methods for producing the same. In addition, the present invention relates to a lithium ion secondary battery using this negative electrode material for lithium ion secondary batteries.

BACKGROUND ART

Conventionally, lithium ion secondary batteries have been widely used because smaller size and larger capacity can be promoted. In the lithium ion secondary battery, lithium is intercalated and deintercalated in the positive electrode and the negative electrode. Therefore, as materials constituting the positive electrode and the negative electrode, that is, active materials, materials capable of intercalating and deintercalating Li are used.

As the negative electrode active materials of lithium ion secondary batteries, carbon materials have conventionally been widely used. However, in recent years, negative electrodes using Si have attracted attention because of higher theoretical capacity than that of carbon. However, the volume of Si changes largely by the intercalation and deintercalation of lithium ions. Therefore, a problem is that the charge and discharge performance decreases during use.

The following Patent Literature 1 discloses a negative electrode material that is a spherical assembly formed by bonding plate-like Si materials, wherein pores are formed inside the assembly, in order to solve such a problem.

CITATION LIST

Patent Literature

Patent Literature 1: Japanese Patent Laid-Open No. 2009-129914

SUMMARY OF INVENTION

Technical Problem

However, in the spherical assembly obtained by bonding plate-like Si as described in Patent Literature 1, the structure has to be complex. Therefore, the production process is complicated.

In addition, even if such a negative electrode material is used, a decrease in which the charge and discharge performance decreases during use cannot be sufficiently suppressed.

It is an object of the present invention to provide a negative electrode material for lithium ion secondary batteries that is easily produced and is less likely to cause deterioration in charge and discharge cycle characteristics, a fine particle-exfoliated graphite composite used in the negative electrode material for lithium ion secondary batteries, and methods for producing the same.

It is another object of the present invention to provide a lithium ion secondary battery using the above negative electrode material for lithium ion secondary batteries.

Solution to Problem

A method for producing a fine particle-exfoliated graphite composite according to the present invention comprises steps of providing resin-retained partially exfoliated graphite having a structure in which graphene is partially exfoliated, obtained by pyrolyzing a resin in a composition in which the resin is fixed to graphite or primary exfoliated graphite, thereby exfoliating the graphite or primary exfoliated graphite while allowing part of the above resin to remain; and heating a raw material composition comprising the above partially exfoliated graphite and fine particles to include the above fine particles in the above partially exfoliated graphite to obtain a fine particle-exfoliated graphite composite.

In the method for producing a fine particle-exfoliated graphite composite according to the present invention, preferably, a pyrolysis temperature of the above fine particles is higher than a pyrolysis temperature of the above resin.

In the method for producing a fine particle-exfoliated graphite composite according to the present invention, preferably, the heating of the above raw material composition is performed at a temperature higher than the pyrolysis temperature of the above resin and lower than the pyrolysis temperature of the above fine particles.

In the method for producing a fine particle-exfoliated graphite composite according to the present invention, preferably, the above fine particles are powdery.

In the method for producing a fine particle-exfoliated graphite composite according to the present invention, preferably, the above fine particles are of an inorganic compound or a metal. More preferably, the above inorganic compound or metal is a material capable of intercalating and deintercalating lithium. Further preferably, the above inorganic compound or metal is at least one selected from the group consisting of Co, Mn, Ni, P, Sn, Ge, Si, Ti, Zr, V, Al, and compounds thereof.

A method for producing a negative electrode material for lithium ion secondary batteries according to the present invention comprises steps of obtaining a fine particle-exfoliated graphite composite according to the present invention; providing a composition comprising the above fine particle-exfoliated graphite composite, a binder resin, and a solvent; and shaping the above composition.

In the method for producing a negative electrode material for lithium ion secondary batteries according to the present invention, preferably, the above fine particles are Si particles, and the inclusion of the above fine particles in the partially exfoliated graphite in the step of obtaining the above fine particle-exfoliated graphite composite is performed by doping the partially exfoliated graphite with the Si particles.

In the method for producing a negative electrode material for lithium ion secondary batteries according to the present invention, preferably, in a step of doping with the above Si particles, a composition comprising the above partially exfoliated graphite and the Si particles is further mixed with a conductive doping promoter.

In the method for producing a negative electrode material for lithium ion secondary batteries according to the present invention, more preferably, at least one selected from the group consisting of ketjen black and acetylene black is used as the above conductive doping promoter.

In the method for producing a negative electrode material for lithium ion secondary batteries according to the present invention, at least one selected from the group consisting of styrene butadiene rubber, carboxymethyl cellulose, polyvinylidene fluoride, a polyimide resin, an acrylic resin, and a butyral resin is used as the above binder resin.

In a fine particle-exfoliated graphite composite according to the present invention, fine particles are included in partially exfoliated graphite having a structure in which graphene is partially exfoliated. Preferably, the above fine particles are Si particles, and the above partially exfoliated graphite is doped with the above fine particles.

A negative electrode material for lithium ion secondary batteries according to the present invention comprises a fine particle-exfoliated graphite composite formed according to the present invention and a binder resin. Preferably, the negative electrode material for lithium ion secondary batteries further comprises a conductive doping promoter.

In the negative electrode material for lithium ion secondary batteries according to the present invention, preferably, the above binder resin is at least one selected from the group consisting of styrene butadiene rubber, carboxymethyl cellulose, polyvinylidene fluoride, a polyimide resin, an acrylic resin, and a butyral resin.

A lithium ion secondary battery according to the present invention comprises as a negative electrode a negative electrode material for lithium ion secondary batteries formed according to the present invention.

The lithium ion secondary battery according to the present invention preferably comprises a negative electrode comprising the above negative electrode material for lithium ion secondary batteries, a positive electrode, and a separator disposed between the above negative electrode and the positive electrode. More preferably, the above negative electrode has no metal foil and comprises the above negative electrode material for lithium ion secondary batteries.

In the lithium ion secondary battery according to the present invention, the above negative electrode may be formed on one surface of the above separator as a coating obtained by providing the above negative electrode material for lithium ion secondary batteries on the one surface.

Advantageous Effects of Invention

According to the method for producing a negative electrode material for lithium ion secondary batteries according to the present invention, it is possible to provide a negative electrode material for lithium ion secondary batteries that is easily produced and is less likely to cause deterioration in charge and discharge cycle characteristics.

In addition, the negative electrode material for lithium ion secondary batteries according to the present invention is easily produced and is less likely to cause deterioration in charge and discharge cycle characteristics.

DESCRIPTION OF EMBODIMENTS

Figure 1:
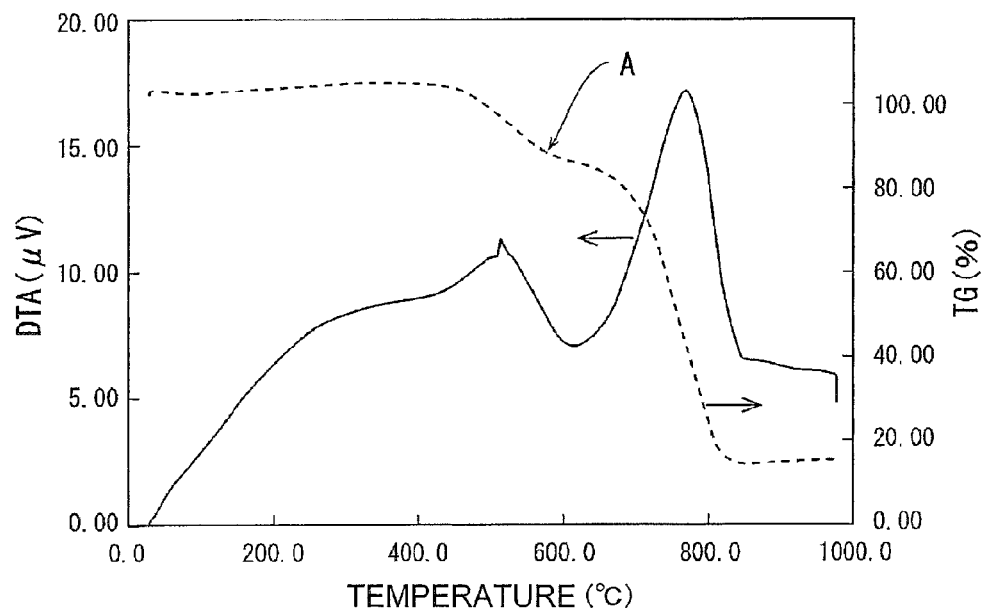
FIG. 1 is a diagram showing the TG/DTA analysis results of resin-retained partially exfoliated graphite doped with Si provided in Example 1.

The details of the present invention will be described below based on specific embodiments. The present invention is not limited to the following embodiments.

A method for producing a fine particle-exfoliated graphite composite according to the present invention comprises the steps of (1) obtaining resin-retained partially exfoliated graphite in which the distance between graphenes is partially increased; and (2) heating a raw material composition comprising the above partially exfoliated graphite and fine particles to include the above fine particles in the above partially exfoliated graphite to obtain a fine particle-exfoliated graphite composite.

(1) Resin-Retained Partially Exfoliated Graphite

The resin-retained partially exfoliated graphite is a composite material comprising a portion in which the interlayer distance between graphenes is increased, and a portion in which graphenes are bonded by a remaining resin. Such resin-retained partially exfoliated graphite can be obtained by a production method comprising the steps of providing a raw material composition comprising graphite or primary exfoliated graphite and a resin, the resin being fixed to the graphite or primary exfoliated graphite; and pyrolyzing the resin contained in the above raw material composition to exfoliate the graphite or primary exfoliated graphite while allowing part of the resin to remain.

Graphite is a stack of a plurality of graphene layers. Examples of the graphite include natural graphite, synthetic graphite, and expanded graphite. As the graphite used as a raw material, expanded graphite is preferred. The distance between graphene layers is larger in expanded graphite than in usual graphite, and therefore, the expanded graphite can be easily exfoliated. Therefore, by using expanded graphite as the raw material graphite, the resin-retained partially exfoliated graphite can be easily produced.

In the above graphite, the number of stacked layers of graphene is about 100000 or more to 1000000, and the BET specific surface area is a value of 20 $m^2$/g or less. The resin-retained partially exfoliated graphite of the present invention refers to one in which the number of stacked layers of graphene is 3000 or less. The BET specific surface area of the resin-retained partially exfoliated graphite is preferably 40 $m^2$/g or more, more preferably 100 $m^2$/g or more. The upper limit value of the BET specific surface area of the resin-retained partially exfoliated graphite is usually 2500 $m^2$/g or less.

As the raw material, primary exfoliated graphite may be used instead of graphite. The primary exfoliated graphite widely includes, in addition to exfoliated graphite obtained by exfoliating graphite, and resin-retained exfoliated graphite, exfoliated graphite obtained by exfoliating graphite by various methods described later. The primary exfoliated graphite is obtained by exfoliating graphite, and therefore, its specific surface area may be larger than that of graphite.

The resin contained in the above resin-retained partially exfoliated graphite is not particularly limited and is preferably a polymer of a radical polymerizable monomer. In this case, the resin may be a homopolymer of one radical polymerizable monomer or a copolymer of a plurality of radical polymerizable monomers. The above radical polymerizable monomer is not particularly limited as long as it is a monomer having a radical polymerizable functional group.

Examples of the above radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylates comprising α-acetoxystyrene, vinyl monomers having a glycidyl group or a hydroxyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl (meth)acrylate, and dimethylaminoethyl (meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group such as Phosmer M, Phosmer CL, Phosmer PE, Phosmer MH, and Phosmer PP manufactured by Uni-Chemical Co., Ltd.; monomers having an alkoxysilyl group such as vinyltrimethoxysilane and 3-methacryloxypropyltrimethoxysilane; and (meth)acrylate monomers having an alkyl group, a benzyl group, or the like.

In the present invention, as the resin contained in the above resin-retained partially exfoliated graphite, preferably, polypropylene glycol, styrene polymers, vinyl acetate polymers, polyglycidyl methacrylate, butyral resins, and the like are preferably used. The reason is that when a silicon powder is inserted between the graphene layers, it is necessary to remove the remaining resin by a firing step, and it is important that the decomposition temperature of the remaining resin is lower than that of the partially exfoliated graphite.

The content of the resin in the above resin-retained partially exfoliated graphite is preferably 1% by mass to 60% by mass. The content is more preferably 5% by mass to 30% by mass, further preferably 10% by mass to 20% by mass. When the content of the resin is too low, the handling properties decrease and a silicon powder cannot be sufficiently inserted between the graphene layers in some cases. When the content of the resin is too high, it may be difficult to insert a sufficient amount of silicon powder between the graphene layers.

In the present invention, the pyrolysis initiation temperature and pyrolysis end temperature of the resin in the resin-retained partially exfoliated graphite are higher than the pyrolysis initiation temperature and pyrolysis end temperature of the resin before composite formation, respectively. In the present invention, the pyrolysis initiation temperature and pyrolysis end temperature refer to TGA measurement-dependent decomposition initiation temperature and decomposition end point temperature, respectively.

The largest feature of the above resin-retained partially exfoliated graphite is that the graphene is not oxidized. Therefore, excellent conductivity is developed. In addition, since the graphene is not oxidized, complicated reduction treatment at high temperature and in the presence of an inert gas is not required. Another feature of the resin-retained exfoliated graphite is that it is relatively less likely to scatter.

This is considered to be because a polymer obtained by polymerizing the above radical polymerizable monomer is not completely decomposed and remains in the pyrolysis step as described later. In other words, it is considered that the polymer positioned in portions sandwiched between the graphene layers in the exfoliated graphite is sandwiched between the graphenes on both sides and therefore does not completely decompose around the pyrolysis temperature. Therefore, the resin-retained partially exfoliated graphite is easily handled.

In addition, in the resin-retained partially exfoliated graphite, the interlayer distance between graphenes is increased, and its specific surface area is large. Further, the resin-retained partially exfoliated graphite has a graphite structure in the central portion and has an exfoliated structure in the edge portion. Therefore, the resin-retained partially exfoliated graphite is more easily handled than conventional exfoliated graphite. In addition, the resin-retained partially exfoliated graphite comprises a resin and therefore has high dispersibility in other resins. Particularly, when other resins are resins having a high affinity for the resin contained in the resin-retained exfoliated graphite, the dispersibility of the resin-retained partially exfoliated graphite in the other resins is higher.

In the production of the above resin-retained partially exfoliated graphite, first, a composition comprising graphite or primary exfoliated graphite and the above resin, the resin being fixed to the graphite or primary exfoliated graphite, is provided.

As the step of providing this composition, for example, the following first and second methods in which a polymer is grafted on graphite or primary exfoliated graphite to fix the polymer to the graphite or primary exfoliated graphite, and a third method in which a polymer is adsorbed on graphite or primary exfoliated graphite to fix the polymer to the graphite or primary exfoliated graphite can be used.

(First Method)

In the first method, first, a mixture comprising the above graphite or primary exfoliated graphite and the above radical polymerizable monomer is provided as a raw material. Next, the radical polymerizable monomer contained in the mixture is polymerized to form a polymer in which the above radical polymerizable monomer is polymerized in the mixture and graft the polymer on the graphite or primary exfoliated graphite.

In the first method, first, a composition comprising the graphite or primary exfoliated graphite and the radical polymerizable monomer is provided.

The blending ratio between the graphite and the radical polymerizable monomer is not particularly limited and is desirably a ratio of 1:1 to 1:100 in terms of a mass ratio. By setting the blending ratio in the above range, it is possible to exfoliate the graphite or primary exfoliated graphite effectively to obtain the resin-retained partially exfoliated graphite much more effectively.

In the step of providing the above composition, preferably, a composition further comprising a pyrolyzable forming agent that generates a gas in pyrolysis is provided. In this case, the graphite or primary exfoliated graphite can be exfoliated much more effectively by heating described later.

The above pyrolyzable foaming agent is not particularly limited as long as it is a compound that decomposes spontaneously by heating and generates a gas during the decomposition. As the above pyrolyzable foaming agent, a foaming agent that generates nitrogen gas during decomposition, for example, an azocarboxylic acid, diazoacetamide, azonitrile compound, benzenesulfohydrazine, or nitroso compound, or a foaming agent that generates carbon monoxide, carbon dioxide, methane, aldehyde, or the like during decomposition can be used. The above pyrolyzable foaming agent may be used alone, or a plurality of foaming agents may be used in combination.

Preferably, as the above pyrolyzable foaming agent, azodicarbonamide (ADCA) having a structure represented by the following formula (1) and foaming agents having structures represented by the following formulas (2) to (4) can be used. These foaming agents decompose spontaneously by heating and generate a nitrogen gas during the decomposition.

[Formula 1]

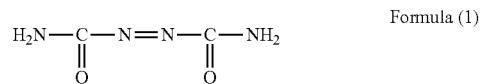

Formula (1)

[Formula 2]

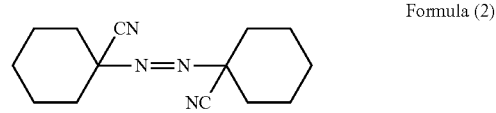

Formula (2)

[Formula 3]

Formula (3)

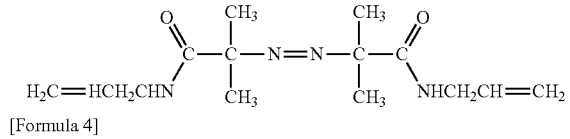

[Formula 4]

Formula (4)

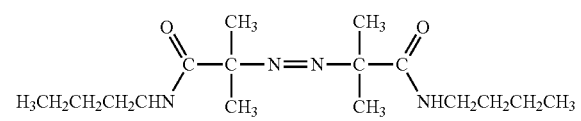

The pyrolysis temperature of the above pyrolyzable foaming agent is not particularly limited and may be lower or higher than a temperature at which the above radical polymerizable monomer spontaneously initiates polymerization. For example, the pyrolysis temperature of the ADCA having the structure represented by the above formula (1) is 210° C., which is a temperature higher than a temperature at which styrene spontaneously initiates polymerization, 150° C., when the above radical polymerizable monomer is styrene. The pyrolysis initiation temperatures of pyrolyzable foaming agents having the structures represented by the above formulas (2) to (4) are 88° C., 96° C., and 110° C. in order, and these are temperatures lower than the temperature at which styrene spontaneously initiates polymerization, 150° C.

The blending ratio between the above graphite or primary exfoliated graphite and the above pyrolyzable foaming agent is not particularly limited, and 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, it is possible to exfoliate the above graphite or primary exfoliated graphite much more effectively to obtain the resin-retained partially exfoliated graphite effectively.

The method for providing the above composition is not particularly limited. Examples of the method include a method of dispersing the above graphite or primary exfoliated graphite in the above radical polymerizable monomer using the above radical polymerizable monomer as a dispersion medium. In addition, the above composition further comprising the above pyrolyzable foaming agent can be provided by dissolving or dispersing the above pyrolyzable foaming agent in the above radical polymerizable monomer.

Next, the step of polymerizing the above radical polymerizable monomer contained in the above composition to form a polymer in which the above radical polymerizable monomer is polymerized in the above composition is performed.

At this time, the above radical polymerizable monomer forms a free radical, and thus, the above radical polymerizable monomer undergoes radical polymerization, and thus, the polymer in which the above radical polymerizable monomer is polymerized is formed. On the other hand, the graphite contained in the above composition is a stack of a plurality of graphene layers and therefore has radical trapping properties. Therefore, when the above radical polymerizable monomer is subjected to polymerization in the above composition comprising the above graphite or primary exfoliated graphite, the above free radical is adsorbed on the ends and surfaces of the graphene layers of the above graphite or primary exfoliated graphite. Therefore, the above polymer or the above radical polymerizable monomer having the above free radical formed during the polymerization is grafted on the ends and surfaces of the graphene layers of the above graphite or primary exfoliated graphite.

Examples of the method for polymerizing the above radical polymerizable monomer contained in the above composition include a method of heating the above composition to the temperature at which the above radical polymerizable monomer spontaneously initiates polymerization or higher. By heating the above composition to the above temperature or higher, a free radical can be formed in the above radical polymerizable monomer contained in the above composition. Thus, the above-described polymerization and grafting can be performed.

When the above radical polymerizable monomer is polymerized by heating as described above, both the polymerization of the above radical polymerizable monomer and the pyrolysis of the above polymer described later can be performed by simply heating the above composition. Therefore, the exfoliation of the graphite or primary exfoliated graphite is much easier.

The above heating method is not particularly limited as long as it is a method that can heat the above composition to the above temperature or higher. The above composition can be heated by an appropriate method and apparatus. In the above heating, heating may be performed without sealing, that is, under normal pressure.

In order to reliably polymerize the above radical polymerizable monomer, after the above composition is heated to a temperature equal to or higher than the temperature at which the above radical polymerizable monomer spontaneously initiates polymerization, the above temperature may be further maintained for a certain time. The time that the above composition is maintained around the above temperature is preferably in the range of 0.5 to 5 hours though depending on the type and amount of the radical polymerizable monomer used.

After the step of forming the above polymer, the step of heating the above composition to the pyrolysis temperature of the above polymer to pyrolyze the above polymer while allowing part of the polymer to remain is performed. Thus, the above polymer contained in the above composition, the above polymer grafted on the ends and surfaces of the graphene layers of the above graphite or primary exfoliated graphite, and the like are pyrolyzed. In the present invention, the pyrolysis temperature of the above polymer refers to TGA measurement-dependent decomposition end point temperature. For example, when the polymer is polystyrene, the pyrolysis temperature of the above polymer is about 350° C.

At this time, when the above polymer grafted on the ends and surfaces of the graphene layers of the above graphite or primary exfoliated graphite, and the like are pyrolyzed, exfoliation force occurs between the above graphene layers. Therefore, by pyrolyzing the above polymer and the like, the above graphite or primary exfoliated graphite can be exfoliated between the graphene layers of the above graphite or primary exfoliated graphite to obtain the partially exfoliated graphite.

Part of the polymer remains in the composition even through this pyrolysis. The pyrolysis initiation temperature and pyrolysis end temperature of the resin in the resin-retained partially exfoliated graphite obtained by the pyrolysis are higher than the pyrolysis initiation temperature and pyrolysis end temperature of the resin before composite formation, respectively.

In the present invention, the exfoliated graphite is a graphene stack after exfoliation obtained by subjecting the original graphite or primary exfoliated graphite to exfoliation treatment, and refers to a graphene stack having a larger specific surface area than the original graphite or primary exfoliated graphite, or a graphene stack in which the decomposition end point shifts to lower temperature than that of the original graphite or primary exfoliated graphite.

The above heating method is not particularly limited as long as it is a method that can heat the above composition to the pyrolysis temperature of the above polymer. The above composition can be heated by an appropriate method and apparatus. In the above heating, heating may be performed without sealing, that is, under normal pressure. Therefore, the exfoliated graphite can be produced inexpensively and easily. Pyrolysis such that the resin is allowed to remain can be achieved by adjusting the heating time. In other words, by shortening the heating time, the amount of the remaining resin can be increased. By lowering the heating temperature, the amount of the remaining resin can also be increased.

Also in the second method and the third method described later, in the step of heating the above composition so as to allow part of the polymer to remain, the heating temperature and the heating time may be adjusted.

After the above composition is heated to a temperature equal to or higher than the pyrolysis temperature of the above polymer, the above temperature may be further maintained for a certain time, when the above polymer can be pyrolyzed so that part of the polymer remains, while part of the polymer is allowed to remain in the composition. The time that the above composition is maintained around the above temperature is preferably in the range of 0.5 to 5 hours though depending on the type and amount of the radical polymerizable monomer used.

When the above radical polymerizable monomer is polymerized by heating in the step of forming the above polymer, heat treatment in the step of forming the above polymer, and heat treatment in the step of pyrolyzing the above polymer described later may be continuously performed by the same method and apparatus.

In the above heating, in a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis. At this time, when the above pyrolyzable foaming agent is pyrolyzed in the vicinity of the graphene layers of the above graphite or primary exfoliated graphite, the above gas generated by the above pyrolysis enters between the above graphene layers, and the spacing between the above graphene layers is increased. Thus, exfoliation force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

By using the above radical polymerizable monomer and/or the above polymer and the above pyrolyzable foaming agent in combination, the graphite or primary exfoliated graphite can be exfoliated much more effectively. The reason why the graphite or primary exfoliated graphite can be exfoliated much more effectively by such a method is not certain, but the following reason is considered. As described above, when the above radical polymerizable monomer forms a free radical, the above polymer or the above radical polymerizable monomer having the above free radical formed during polymerization is grafted on the ends and surfaces of the graphene layers of the above graphite or primary exfoliated graphite. Therefore, the above free radical is trapped in the graphene layers of the above graphite or primary exfoliated graphite. On the other hand, the above pyrolyzable foaming agent has the property of high affinity for radicals and therefore is attracted to the free radical trapped in the graphene layers of the above graphite or primary exfoliated graphite in the above composition. Therefore, the above pyrolyzable foaming agent is easily pyrolyzed in the vicinity of the stacked surfaces of the graphene sheets of the graphite or primary exfoliated graphite. Therefore, exfoliation force can be effectively applied between the graphene layers of the above graphite or primary exfoliated graphite by the pyrolysis of the above pyrolyzable foaming agent.

The pyrolysis of the above pyrolyzable foaming agent need not necessarily be performed in the step of pyrolyzing the above polymer. For example, when the pyrolysis temperature of the above pyrolyzable foaming agent is lower than the temperature at which the above radical polymerizable monomer spontaneously initiates polymerization, the above pyrolyzable foaming agent may be pyrolyzed when the above radical polymerizable monomer is polymerized by heating in the step of forming the above polymer. The pyrolysis of the above pyrolyzable foaming agent may be before the polymerization of the radical polymerizable monomer, after the polymerization, or simultaneous with the polymerization.

In order to reliably pyrolyze the above pyrolyzable foaming agent, after the above composition is heated to a temperature equal to or higher than the pyrolysis temperature of the above pyrolyzable foaming agent, the above temperature may be further maintained for a certain time. The time that the above composition is maintained in the vicinity of the above temperature is preferably in the range of 0.5 to 5 hours though depending on the type and amount of the pyrolyzable foaming agent used.

(Second Method)

In the second method, in the step of providing a composition comprising graphite or primary exfoliated graphite and a polymer in which a radical polymerizable monomer is polymerized, the polymer being grafted on the graphite or primary exfoliated graphite, the polymer is heated to a temperature in the temperature range of 50° C. or higher and 400° C. or lower in the presence of the graphite or primary exfoliated graphite to graft the polymer on the graphite or primary exfoliated graphite. In other words, in the first method, a radical polymerizable monomer is polymerized in the presence of graphite or primary exfoliated graphite to form a polymer and promote the grafting of the polymer on the graphite or primary exfoliated graphite, whereas in the second method, by heating a previously obtained polymer to the above particular temperature range in the presence of graphite or primary exfoliated graphite, a polymer radical formed by pyrolyzing the polymer can be directly grafted on the graphite or primary exfoliated graphite.

As the polymer in the second method, an appropriate pyrolytic radical-forming polymer can be used.

Most organic polymers generate radicals at decomposition temperature. Therefore, as polymers that form radicals in the vicinity of the above decomposition temperature, many organic polymers can be used.

In the second method, the blending ratio between the above graphite or primary exfoliated graphite and the above polymer is not particularly limited and is desirably a ratio of 1:5 to 1:20 in terms of a weight ratio. By setting the blending ratio in this range, it is possible to exfoliate the graphite or primary exfoliated graphite more effectively to obtain the resin-retained partially exfoliated graphite effectively.

Also in the second method, as in the case of the first method, in the step of providing the composition, preferably, it is desired to further contain a pyrolyzable foaming agent in the composition. As in the case of the first method, the graphite or primary exfoliated graphite can be exfoliated much more effectively by heating that causes the pyrolysis of the polymer described later.

The pyrolyzable foaming agents that can be used are similar to those in the case of the first method. Therefore, preferably, it is desired to use the foaming agents having the structures represented by formula (1) to (4) described above.

Also in the second method, the blending ratio between the graphite or primary exfoliated graphite and the pyrolyzable foaming agent is not particularly limited, and the pyrolyzable foaming agent is preferably blended in the ratio of 100 to 300 parts by weight based on 100 parts by weight of the graphite or primary exfoliated graphite. When the blending ratio is in this range, the graphite or primary exfoliated graphite can be exfoliated much more effectively.

Also in the second method, the specific method for providing the composition is not limited. Examples of the specific method include a method of introducing the above polymer and graphite or primary exfoliated graphite into an appropriate solvent or dispersion medium and heating the mixture.

The polymer is grafted on the graphite or primary exfoliated graphite by the above heating. This heating temperature is desirably in the range of 50° C. or higher and 400° C. or lower. By setting the heating temperature in this temperature range, the polymer can be effectively grafted on the graphite. Thus, the graphite or primary exfoliated graphite can be exfoliated much more effectively. The reason for this is considered as follows.

By heating the polymer obtained by polymerizing the above radical polymerizable monomer, part of the polymer decomposes, and a radical is trapped in the graphene layers of the graphite or primary exfoliated graphite. Therefore, the polymer is grafted on the graphite or primary exfoliated graphite. Then, when the polymer is decomposed and fired in a heating step described later, a large stress is applied to the graft surface of the graphite or primary exfoliated graphite where the polymer is grafted. Therefore, it is considered that exfoliation force acts starting from the grafting point, and the distance between the graphene layers is effectively increased.

(Third Method)

Examples of the third method can include a method of dissolving or dispersing the above graphite and the above polymer in an appropriate solvent. As such a solvent, tetrahydrofuran, methyl ethyl ketone, toluene, ethyl acetate, and the like can be used.

When the pyrolyzable foaming agent is used, the pyrolyzable foaming agent may be further added and dispersed or dissolved in the above solvent.

In the third method, as the above composition, a composition in which a polymer is adsorbed on graphite or primary exfoliated graphite is provided in a solvent. The method for adsorbing the polymer on the graphite or primary exfoliated graphite is not particularly limited. The polymer has adsorption properties on graphite, and therefore, a method of mixing the graphite or primary exfoliated graphite with the polymer in the above-described solvent can be used. Preferably, in order to adsorb the polymer on the graphite or primary exfoliated graphite more effectively, ultrasonic treatment is desirably carried out. The ultrasonic treatment method is not particularly limited. For example, a method of irradiation with ultrasonic waves at about 100 W and an oscillation frequency of about 28 kHz using an appropriate ultrasonic treatment apparatus can be used.

The ultrasonic treatment time is also not particularly limited and may be equal to or more than the time required for the polymer to be adsorbed on the graphite. For example, in order to adsorb polyvinyl acetate on the graphite, the ultrasonic treatment may be preferably maintained for about 30 minutes to 120 minutes.

It is considered that the adsorption of the polymer is due to the interaction of the surface energy of the graphite with the polymer.

(Step of Exfoliating Graphite by Pyrolysis of Resin)

In all of the above first method, second method, and third method, after the composition is provided as described above, the polymer contained in the composition is pyrolyzed. Thus, the graphite or primary exfoliated graphite is exfoliated while part of the polymer is allowed to remain, and the resin-retained exfoliated graphite can be obtained. In order to perform the pyrolysis of the polymer in this case, the above composition may be heated to the pyrolysis temperature of the polymer or higher. More specifically, the above composition is heated to the pyrolysis temperature of the polymer or higher, and the polymer is further fired. At this time, the polymer is fired to the extent that the polymer remains in the composition. Thus, the resin-retained partially exfoliated graphite can be obtained. For example, the pyrolysis temperature of polystyrene is about 380° C. to 450° C., the pyrolysis temperature of polyglycidyl methacrylate is about 400° C. to 500° C., and the pyrolysis temperature of polybutyral is about 550° C. to 600° C. in the air.

It is considered that the resin-retained partially exfoliated graphite can be obtained by the pyrolysis of the above polymer for the above-described reason, that is, because when the polymer grafted on the graphite is fired, large stress acts on the grafting point, and thus, the distance between the graphenes increases.

In the first method, it has been described that the heating for polymerizing the radical polymerizable monomer and the pyrolysis of the above polymer may be continuously carried out in the same heating step. Also in the second method, the heating step for grafting the above polymer on the graphite or primary exfoliated graphite and the heating step of pyrolyzing the above polymer may be continuously carried out.

There is no oxidation step in this pyrolysis treatment, and the deterioration of the obtained exfoliated graphite by oxidation is prevented. Therefore, the conductivity derived from the graphite is maintained.

(2) Step of Obtaining Fine Particle-Exfoliated Graphite Composite

In the present invention, the fine particle-exfoliated graphite composite is obtained by heating a raw material composition comprising the resin-retained partially exfoliated graphite provided as described above and fine particles, thereby including the fine particles in the partially exfoliated graphite. The pyrolysis temperature of the above fine particles is preferably higher than the pyrolysis temperature of the above resin. The heating of the above raw material composition is preferably performed at a temperature higher than the pyrolysis temperature of the above resin and lower than the pyrolysis temperature of the above fine particles because the fine particles can be included in the partially exfoliated graphite much more efficiently by heating in this range. More particularly, the heating temperature is preferably in the range of about 370° C. to 500° C.

The above fine particles are not particularly limited, and a powdery fine particle powder can be used. The average particle diameter of the fine particles is not particularly limited and is preferably about 20 nm to 50000 nm. In such a range of the average particle diameter, the fine particles can be easily introduced into the partially exfoliated graphite.

The blending ratio of the fine particles is not particularly limited and is desirably in the range of 1 to 800 parts by weight based on 100 parts by weight of the partially exfoliated graphite.

As the above fine particles, a material such as an inorganic compound or a metal can be used. As such a material, at least one selected from the group consisting of Co, Mn, Ni, P, Sn, Ge, Si, Ti, Zr, V, Al, and compounds thereof is used. Particularly, in the case of use as a constituent material of a negative electrode material for lithium ion secondary batteries, a material capable of intercalating and deintercalating lithium can be used.

In the case of use as a constituent material of a negative electrode material for lithium ion secondary batteries, it is preferred to heat a raw material composition comprising the partially exfoliated graphite and Si particles that are fine particles, thereby doping the partially exfoliated graphite with the Si particles, that is, including the Si particles in the partially exfoliated graphite. This heating temperature is not particularly limited and is preferably in the range of about 400° C. to 550° C. By heating at a temperature in such a range, the Si particles enter between the graphene layers of the partially exfoliated graphite much more reliably. In other words, the Si particles enter portions where the graphenes of the partially exfoliated graphite are spaced, and the partially exfoliated graphite is doped with the Si particles. Thus, a Si composite carbonaceous material can be obtained.

The above Si particles are not particularly limited, and various commercial Si powders can be used. The average particle diameter of the Si particles is not particularly limited and is preferably about 20 nm to 500 nm. In such a range of the average particle diameter, the Si particles can be easily introduced between the graphenes of the partially exfoliated graphite.

The blending ratio of the Si particles is not particularly limited and is desirably in the range of 5 to 80 parts by weight based on 100 parts by weight of the partially exfoliated graphite.

By heating the raw material composition comprising Si particles and the partially exfoliated graphite to the above temperature by an appropriate method, the partially exfoliated graphite can be doped with the Si particles as described above.

A method for producing a negative electrode material for lithium ion secondary batteries according to the present invention comprises the steps of obtaining a fine particle-exfoliated graphite composite according to the above-described production methods (1) and (2); (3) providing a composition comprising the above fine particle-exfoliated graphite composite, a binder resin, and a solvent; and (4) shaping the composition.

(3) Step of Providing Composition for Shaping

A composition comprising the above partially exfoliated graphite doped with Si particles, a binder resin, and a solvent is provided. Here, the binder resin is not particularly limited. As such a binder resin, preferably, at least one selected from the group consisting of styrene butadiene rubber, carboxymethyl cellulose, polyvinylidene fluoride, a polyimide resin, an acrylic resin, and a butyral resin is used. In other words, an aqueous binder resin may be used, or a nonaqueous binder resin may be used. As the aqueous binder resin, the above styrene butadiene rubber (SBR) or carboxymethyl cellulose (CMC) is preferably used. As the nonaqueous binder resin, at least one of the above polyvinylidene fluoride (PVDF), polyimide resin, acrylic resin, and butyral resin is preferably used.

In order to make the shaping of the above composition easy, and in order to make kneading easy, an appropriate solvent is added. Such a solvent is not particularly limited, and organic solvents such as tetrahydrofuran (THF), ethanol, and N-methylpyrrolidone (NMP) or water can be used.

The blending ratio between the partially exfoliated graphite doped with Si particles and the binder resin in the above composition is not particularly limited, and the binder resin is desirably blended in the ratio of about 2 parts by weight to 20 parts by weight based on 100 parts by weight of the partially exfoliated graphite doped with Si particles. When the blending ratio is in this range, a negative electrode material for lithium ion secondary batteries that develops sufficient functions as a negative electrode can be provided. When the blending ratio of the binder resin is too low, molding may be difficult.

(4) Shaping

In the present invention, by shaping the composition provided as described above, a negative electrode material for lithium ion secondary batteries is obtained. For this shaping, various forming methods may be used, or the shaping may be performed by applying and drying the above composition.

Particularly, as described later, the negative electrode material for lithium ion secondary batteries according to the present invention can be used alone as a negative electrode material for lithium ion secondary batteries without using metal foil such as Cu foil. Therefore, it is also possible to easily form the negative electrode for lithium ion secondary batteries, for example, by applying the above composition to one surface of a separator and drying it.

(Conductive Doping Promoter)

In the present invention, preferably, in the step of doping with the above Si particles, a conductive doping promoter is further mixed in addition to the partially exfoliated graphite and the Si particles. In this case, the partially exfoliated graphite can be doped with the Si particles much more easily.

Examples of the conductive doping promoter can include ketjen black and acetylene black. Preferably, at least one selected from the group consisting of ketjen black and acetylene black is desirably used. The amount of doping with the Si particles can be increased.

The addition ratio of the above conductive doping promoter is not particularly limited and is desirably about 50 to 300 parts by weight based on 100 parts by weight of the Si particles. When the addition ratio is in this range, the partially exfoliated graphite can be easily doped with the Si particles without causing deterioration in characteristics as the negative electrode of a lithium ion secondary battery.

(Fine Particle-Exfoliated Graphite Composite)

In a fine particle-exfoliated graphite composite according to the present invention, fine particles are included between graphene layers in partially exfoliated graphite. Therefore, the fine particle-exfoliated graphite composite according to the present invention has high thermal conductivity also in the thickness direction unlike graphite. Particularly, when boron nitride, silicon carbide, or various metals are used as the fine particles, higher thermal conductivity is obtained. Therefore, as the material constituting the fine particles, generally, materials having high thermal conductivity are preferably used.

When the fine particle-exfoliated graphite composite according to the present invention is used as constituent materials of electrodes (positive electrode and negative electrode) for lithium ion secondary batteries, a lithium ion secondary battery that has high battery efficiency and is less likely to suffer performance deterioration due to repetition is obtained. In this case, as the material constituting the fine particles, at least one selected from the group consisting of lithium transition metal oxides (of Co, Mn, Ni, P, and combinations thereof), Sn, Ge, Si, Ti, Zr, V, Al, and compounds thereof, which can intercalate and deintercalate lithium, is preferably used. As the above compounds thereof, for example, $SiO$, $SiO_2$, and the like can be used in the case of Si, and $TiO_2$ and the like can be used in the case of Ti.

(Negative Electrode Material for Lithium Ion Secondary Battery)

According to the present invention, a negative electrode material for lithium ion secondary batteries is obtained by the above-described production process. The negative electrode material for lithium ion secondary batteries according to the present invention comprises the above partially exfoliated graphite that is resin-retained partially exfoliated graphite, having a structure in which graphene is partially exfoliated, fine particles included in the partially exfoliated graphite, and a binder resin. Particularly, when Si is used as the fine particles, Si can be bonded to a larger amount of Li than carbon. In other words, when Si is used, the theoretical capacity is far higher than when a carbon material is used. However, a conventional problem is that when Si is used, the volume change due to charge and discharge is large, and the life characteristics, that is, charge and discharge cycle characteristics, decrease.

On the other hand, with the negative electrode material for lithium ion secondary batteries provided by the present invention, the charge and discharge cycle characteristics are less likely to decrease. This is considered to be for the following reason.

In the present invention, the space between the graphenes of the partially exfoliated graphite is doped with fine particles such as Si particles, that is, fine particles such as Si particles are included between the graphenes of the partially exfoliated graphite. Therefore, it is considered that the fine particles closely inserted between the graphenes having high conductivity are protected by the graphenes having a stable structure also against volume change in the occurrence of the intercalation and deintercalation of Li ions, and therefore, the deterioration in charge and discharge cycle characteristics is small. Therefore, according to the present invention, a lithium ion secondary battery using fine particles such as Si particles having high theoretical capacity, and having excellent charge and discharge characteristics and moreover excellent life characteristics can be provided.

Preferably, as described above, the negative electrode material for lithium ion secondary batteries desirably comprises the above conductive doping promoter, and thus, doping with the Si particles is reliable. In addition, when the above preferred resin is used as the binder resin, the amount of doping with the Si particles can be increased.

(Lithium Ion Secondary Battery)

A lithium ion secondary battery according to the present invention comprises the above negative electrode material for lithium ion secondary batteries as a negative electrode. Therefore, deterioration in charge and discharge cycle characteristics is less likely to occur. Generally, a lithium ion secondary battery comprises a negative electrode, a positive electrode, and a separator disposed between the negative electrode and the positive electrode. As this negative electrode, the negative electrode material for lithium ion secondary batteries according to the present invention is preferably used.

Particularly, the above negative electrode material for lithium ion secondary batteries develops a scale in which it constitutes a negative electrode alone. Therefore, it is also possible to constitute a negative electrode having no metal foil and comprising only the above negative electrode material for lithium ion secondary batteries. In this case, the simplification and cost reduction of the production process can be achieved. Particularly, with a structure in which the above negative electrode material for lithium ion secondary batteries is formed on one surface of a separator as a coating, much more simplification and cost reduction of the production process can be achieved.

In order to form the above negative electrode material for lithium ion secondary batteries as a coating as described above, the above composition which is provided for production of the above-described negative electrode material may be applied to one surface of a separator and then dried. Therefore, the separator and the negative electrode can be formed in a simple step.

Examples and Comparative Examples

Next, the present invention will be clarified by giving specific Examples and Comparative Examples of the present invention. The present invention is not limited to the following Examples.

In the following Examples and Comparative Examples, resin-retained partially exfoliated graphite provided as follows was used.

(Preparation of Resin-Retained Partially Exfoliated Graphite)

20 g of expanded graphite (manufactured by TOYO TANSO CO., LTD., trade name "PF Powder", PET surface area=22 $m^2$/g), 40 g of ADCA having the structure represented by formula (1) (manufactured by EIWA CHEMICAL IND. CO., LTD, trade name "AC#R-K", pyrolysis temperature 210° C.) as a pyrolyzable foaming agent, and 400 g of polypropylene glycol PPG (manufactured by Sanyo Chemical Industries, Ltd., product number: SANNIX GP-3000, number average molecular weight=3000) were mixed with 400 g of tetrahydrofuran as a solvent to provide a raw material composition. The raw material composition was irradiated with ultrasonic waves at 100 W and an oscillation frequency of 28 kHz for 5 hours using an ultrasonic treatment apparatus (manufactured by Honda Electronics Co., Ltd.). The polypropylene glycol was adsorbed on the expanded graphite by the ultrasonic treatment. In this manner, a composition in which polypropylene glycol was adsorbed on expanded graphite was provided.

After the above ultrasonic irradiation, the above composition was molded by a solution casting method, maintained at a drying temperature of 80° C. for 2 hours, then maintained at a temperature of 110° C. for 1 hour, further maintained at a temperature of 150° C. for 1 hour, and further maintained at a temperature of 230° C. for 2 hours. Thus, the above ADCA was pyrolyzed and foamed in the above composition.

Next, the heating step of maintaining the above composition at a temperature of 450° C. for 1.5 hours was carried out. Thus, the above polypropylene glycol was pyrolyzed to obtain resin-retained exfoliated graphite. In this resin-retained exfoliated graphite, part of the polypropylene glycol remains.

A burning test was performed in which the obtained resin-retained partially exfoliated graphite was heated to 30° C. to 1000° C. at a rate of 10° C./min under an air atmosphere. The TG/DTA measurement results when this burning test was performed are shown in FIG. 1.

An inflection point appears in the TG curve in the vicinity of 570° C. shown by the arrow A in FIG. 1. It is considered that the polypropylene glycol remains also at temperatures higher than this inflection point.

Figure 2:
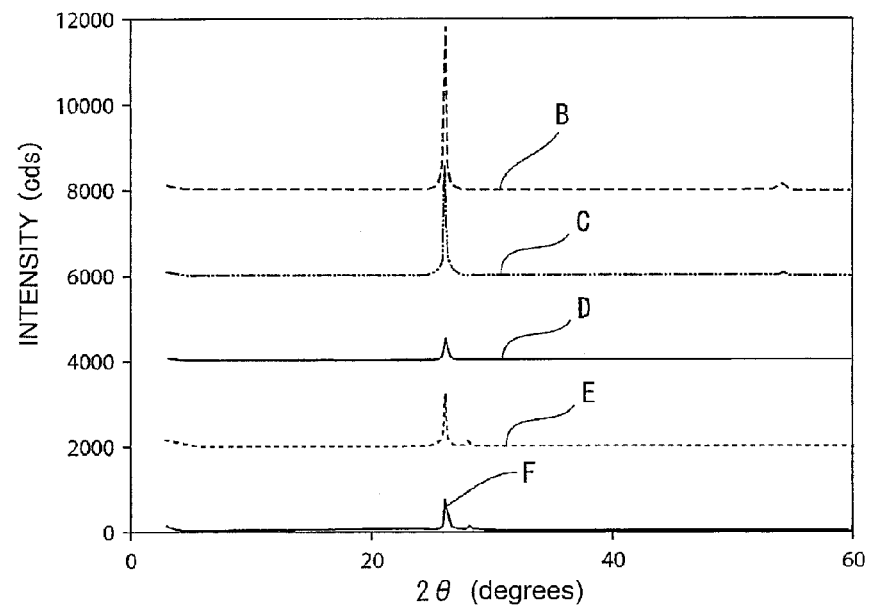
FIG. 2 is a diagram showing the XRD spectra of expanded graphite as raw material graphite, partially exfoliated graphite, and partially exfoliated graphite doped with Si particles used in Example 1, and a sheet-like negative electrode material for lithium ion secondary batteries in Example 1.

The XRD spectrum of a sample obtained by heating the resin-retained partially exfoliated graphite obtained as described above at a temperature of 450° C. for 30 minutes is shown by the solid line D in FIG. 2. Further, the XRD spectrum of a sample obtained by heat-treating the above partially exfoliated graphite at a temperature of 500° C. for 30 minutes is shown by the dashed double-dotted line C in FIG. 2. Further, for comparison, the XRD spectrum of the expanded graphite PF Powder that is raw material graphite is shown by the broken line B in FIG. 2. It is seen that compared with the broken line B, in the solid line D, the peak derived from graphite around 26° is significantly small. Therefore, it is seen that the graphene layers are spaced. On the other hand, it is considered that in the dashed double-dotted line C, the peak in the vicinity of 26° is large because the resin completely disappeared by the heat treatment at 500° C., and the graphene was stacked again.

Figure 3:
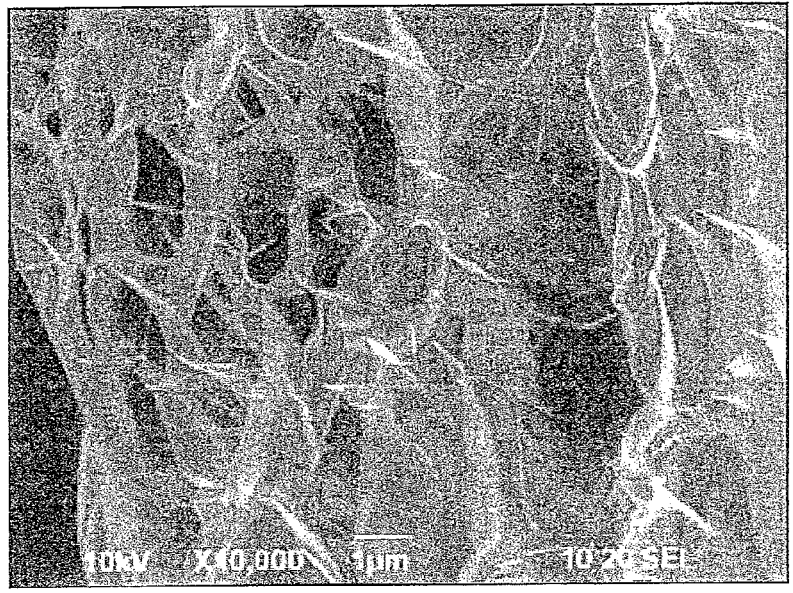
FIG. 3 is a scanning electron micrograph at 10000× magnification of the resin-retained partially exfoliated graphite used in Example 1.

FIG. 3 is a scanning electron micrograph at 10000× magnification of the resin-retained partially exfoliated graphite specified as described above. As is clear from FIG. 3, it is seen that the graphene layers are spaced.

Example 1

100 mg of the resin-retained partially exfoliated graphite obtained as described above, 10 mg of Si particles having an average particle diameter of 50 nm (NM-0020-HP manufactured by Ionic Liquids Technologies; φ 50 nm), and 20 mg of ketjen black (EC600JD manufactured by Lion Corporation) were introduced into 20 g of ethanol as a dispersion solvent and dispersed. Next, the dispersion was irradiated with ultrasonic waves at 100 W and an oscillation frequency of 28 kHz for 4 hours using an ultrasonic treatment apparatus (manufactured by Honda Electronics Co., Ltd.). The Si particles were adsorbed on the partially exfoliated graphite by this ultrasonic treatment.

Thereafter, the composition treated as described above was maintained at a drying temperature of 80° C. to remove the ethanol as a dispersion medium. Further, the composition was heated at 110° C. for 1 hour, at 150° C. for 1 hour, and at 500° C. for 2 hours. Thus, partially exfoliated graphite doped with Si particles was obtained.

The XRD spectrum was measured for the partially exfoliated graphite doped with Si particles obtained as described above. It is shown by the broken line E in FIG. 2. As is clear from the broken line E in FIG. 2, it is seen that for the obtained partially exfoliated graphite doped with Si particles, a peak in the vicinity of 28° derived from the Si particles as a raw material powder appears. Further, it is seen that as in the case of a material obtained by burning the above partially exfoliated graphite at 500° C. for 2 hours, a graphite peak appears in the vicinity of 26°.

Figure 4:
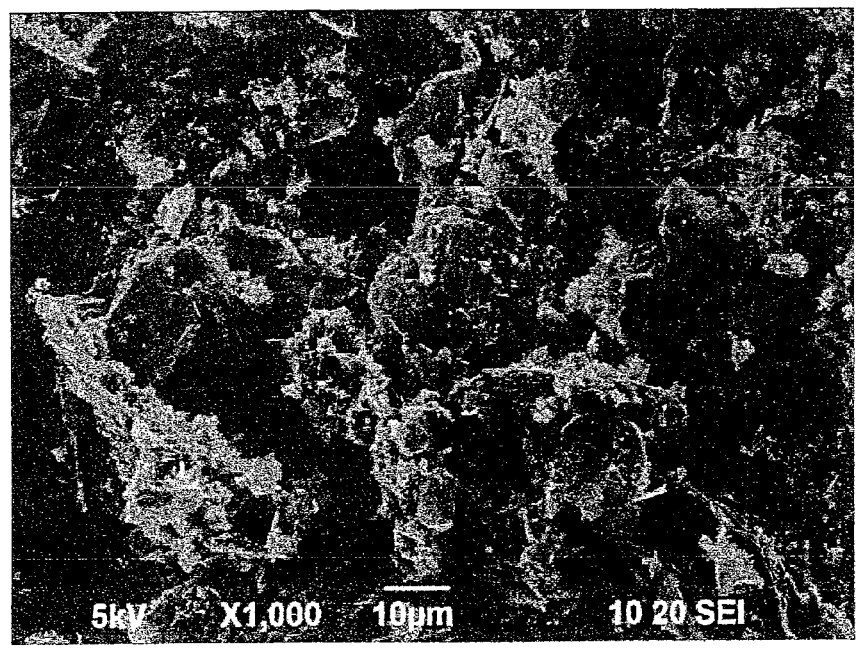
FIG. 4 is a scanning electron micrograph at 1000× magnification of the partially exfoliated graphite doped with Si particles made in Example 1.

FIG. 4 is a scanning electron micrograph at 1000× magnification of the above partially exfoliated graphite doped with Si particles, that is, partially exfoliated graphite in which Si particles are included, obtained in this Example. As is clear from FIG. 4, it is seen that in this material, the Si particles are inserted between the graphenes.

Figure 22:
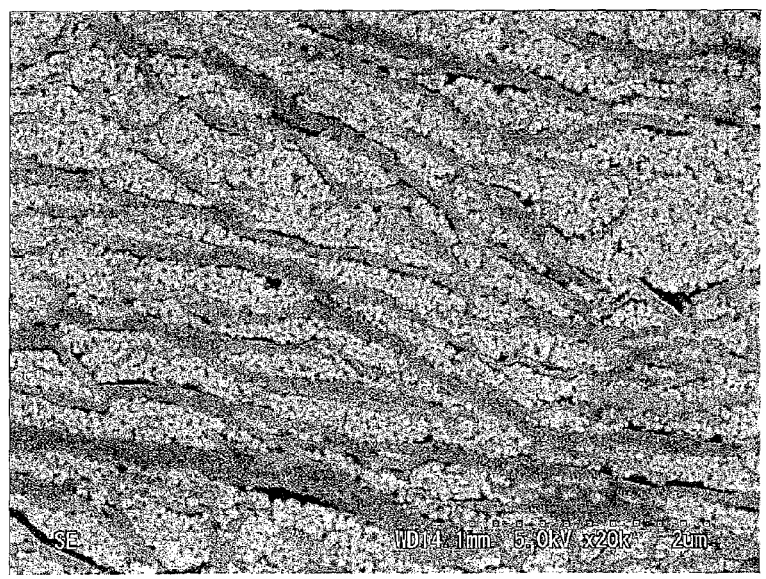
FIG. 22 is a scanning electron micrograph at 20000× magnification of a cross section, along the thickness direction, of the edge portion of the partially exfoliated graphite doped with Si particles made in Example 1.

FIG. 22 is a scanning electron micrograph at 20000× magnification of a cross section, along the thickness direction, of the edge portion of the partially exfoliated graphite doped with Si particles obtained in this Example.

As is clear from FIG. 22, it is seen that the space between the graphene layers of the edge portion of the partially exfoliated graphite is doped with the Si particles.

50 mg of the partially exfoliated graphite doped with Si particles obtained as described above and 100 mg of a butyral resin (LB-1 manufactured by SEKISUI CHEMICAL CO., LTD.) as a binder resin were introduced into a 5% by weight methanol solution and kneaded. The material obtained by the kneading was filtered under reduced pressure using a filter comprising a fluorine resin, and dried at 85° C. for 1 hour, at 110° C. for 1 hour, and further at 150° C. for 2 hours. As a result, a sheet-like material, that is, a negative electrode material for lithium ion secondary batteries in this Example, was formed on the filter.

TG/DTA analysis was performed for the sheet-like negative electrode material for secondary batteries obtained as described above. The results are shown in FIG. 5.

Figure 5:
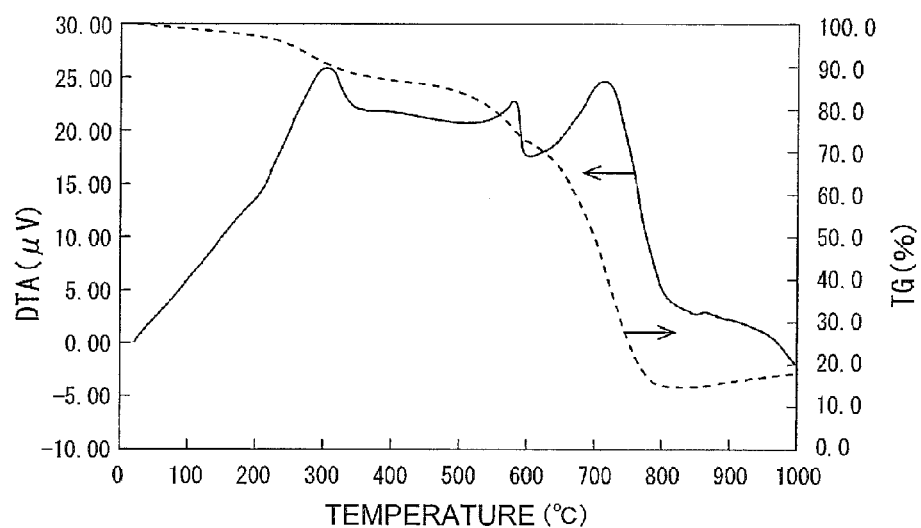
FIG. 5 is a diagram showing the TG/DTA measurement results of the sheet as a negative electrode material for lithium ion secondary batteries obtained in Example 1.

As is clear from FIG. 5, it is seen that in the TG/DTA analysis, the temperature increases, first the butyral resin burns, further the ketjen black as a conductive doping promoter decomposes, and finally the Si particles remain. In other words, it is considered that in the region of temperatures higher than 770° C. in the TG curve, only the Si particles remain. Therefore, it is seen that about 11% by weight of the Si particles are contained in the negative electrode material for secondary batteries comprising a binder resin.

The solid line F in FIG. 2 shows the XRD spectrum for the sheet-like negative electrode material for secondary batteries obtained as described above. As is clear from the solid line F, it is seen that a peak derived from graphite appears in the vicinity of 26°, and a peak derived from the Si particles appears in the vicinity of 28°.

Figure 6:
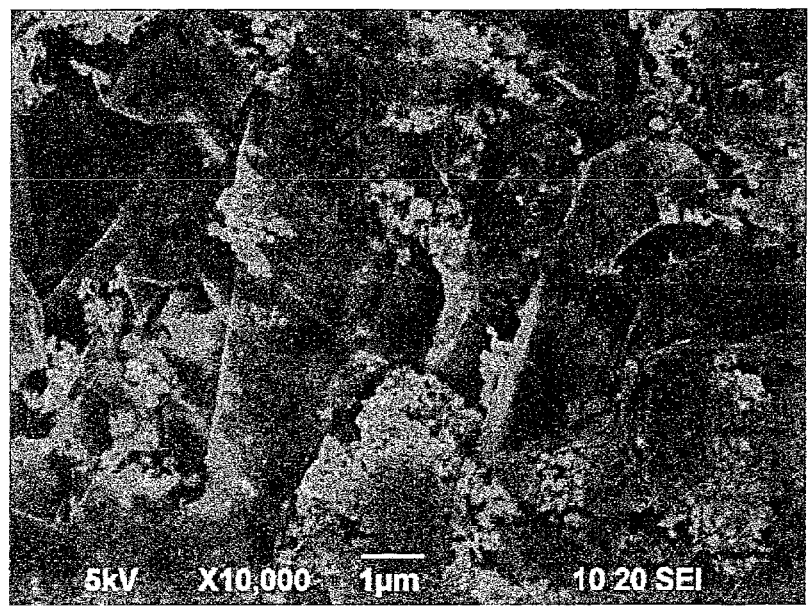
FIG. 6 is a scanning electron micrograph at 10000× magnification of the negative electrode material for lithium ion secondary batteries obtained in Example 1.

A scanning electron micrograph at 10000× magnification of the negative electrode material for secondary batteries obtained as described above is shown in FIG. 6. As is clear from FIG. 6, it is seen that a sheet comprising partially exfoliated graphite in which the space between graphenes is doped with Si particles is obtained.

Next, the negative electrode material for lithium ion secondary batteries obtained as described above was punched into a circular sheet having a diameter of 25 mm. A coin type secondary battery was made using this negative electrode material for lithium ion secondary batteries on a circular sheet. All subsequent experiments were performed in an argon gas-sprayed glove box.

The above circular sheet comprising the negative electrode material for secondary batteries that was dried was carried into a glove box with the vacuum maintained. At the same time, a coin type battery (HS cell: battery cell for experimentation of a Li ion secondary battery) dried in an oven at 120° C. was carried into the glove box.

Figure 7:
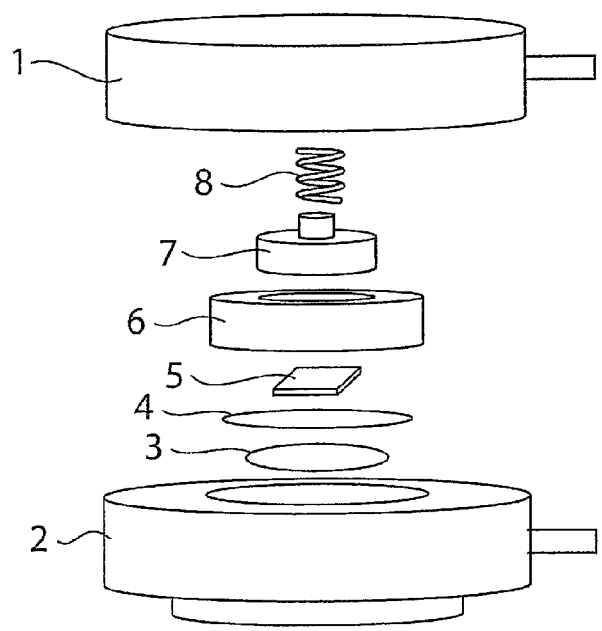
FIG. 7 is an exploded perspective view showing the schematic configuration of a coin type battery (battery cell for Li secondary battery experiment) assembled as a battery for evaluation in Example 1.

The structure of the above coin type battery (HS cell) is schematically shown in FIG. 7 in an exploded perspective view.

As shown in FIG. 7, a sheet made from a negative electrode material for secondary batteries 3, a separator 4, a metal lithium piece 5, a jig made from a resin 6, a collecting electrode 7, and a spring 8 were stacked between a counter electrode 1 and a working electrode 2 in order from the working electrode 2 side. The positive electrode is the above metal lithium piece 5. As the metal lithium piece 5, Li foil having a thickness of 0.2 mm and a diameter of 16 mm was used. The separator 4 (ESFINO manufactured by SEKISUI CHEMICAL CO., LTD. (25 μm)) punched into a diameter of 24 mm was used. As the electrolytic solution, a 1 mol/L LiPF6/EC:DMC (1.2 v/v %) electrolytic solution manufactured by KISHIDA CHEMICAL Co., LTD. was used.

In the coin type battery assembled as described above, after the voltage dropped to 0.01 V, a current of 1 mA was applied for 8 hours to charge the coin type battery. After the charge, the operation was stopped for 1 minute. Next, the coin type battery was discharged with a current of 1 mA until the voltage reached 3.0 V. Next, the operation was stopped for 1 minute.

Figure 8:
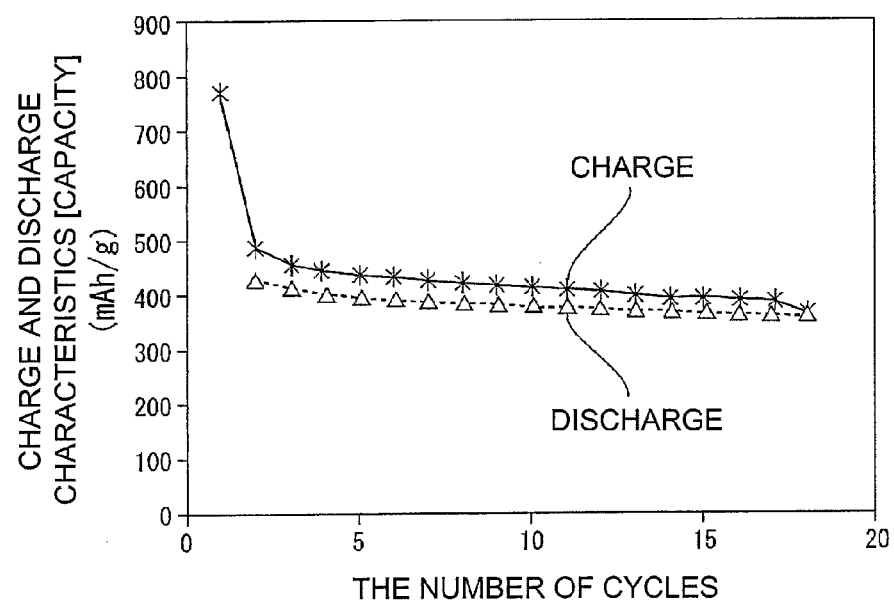
FIG. 8 is a diagram showing the charge and discharge characteristics of a lithium ion secondary battery obtained in Example 1.

A cycle comprising the above charge and discharge was repeated. The charge and discharge test results are shown in FIG. 8. The horizontal axis in FIG. 8 shows the number of cycles of charge and discharge, and the vertical axis shows capacity (mAh/g), that is, charge and discharge characteristics.

As is clear from FIG. 8, it is seen that according to this Example, even if charge and discharge are repeated, the deterioration in charge and discharge characteristics is small.

Figure 9:
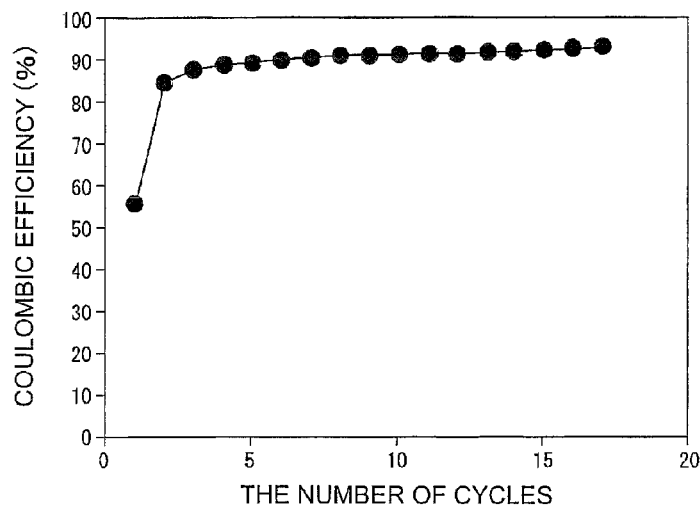
FIG. 9 is a diagram showing life characteristics in terms of coulombic efficiency for the lithium ion secondary battery obtained in Example 1.

FIG. 9 is a diagram showing life characteristics in terms of coulombic efficiency. As is clear from FIG. 9, it is seen that the initial efficiency is also good and is maintained.

Example 2

Partially exfoliated graphite doped with Si particles was obtained as in Example 1 except that in the production of partially exfoliated graphite doped with Si particles, tetrahydrofuran (THF) was used as the dispersion medium instead of ethanol. Subsequently, a negative electrode material for lithium ion secondary batteries was made as in Example 1, and further, evaluation was performed as in Example 1.

Figure 10:
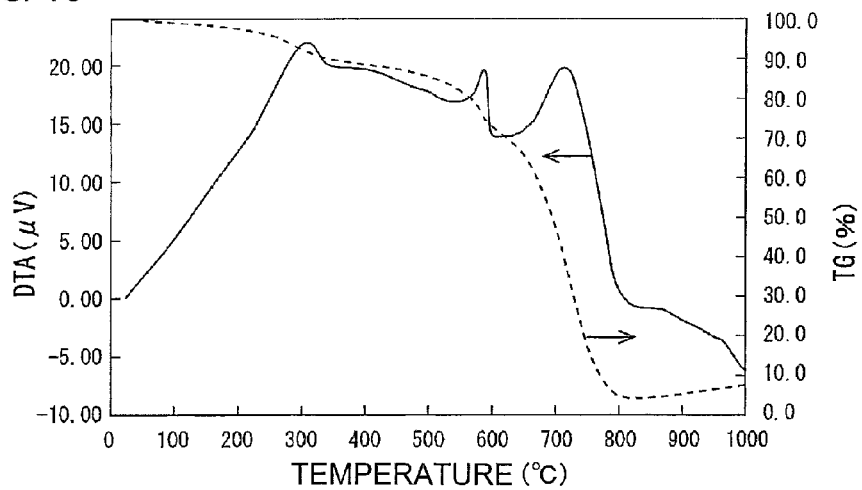
FIG. 10 is a diagram showing the TG/DTA measurement results of a sheet as a negative electrode material for lithium ion secondary batteries obtained in Example 2.

FIG. 10 is a diagram showing the TG/DTA analysis results of the sheet-like negative electrode material for lithium ion secondary batteries obtained in Example 2. It is seen that also in this Example, an inflection point appears in the vicinity of 780° C. in the TG curve, and in a higher-temperature region than 780° C., the Si particles remain.

Figure 11:
FIG. 11 is a scanning electron micrograph at 10000× magnification of the sheet-like negative electrode material for lithium ion secondary batteries obtained in Example 2.

FIG. 11 is a scanning electron micrograph at 10000× magnification of the above sheet-like negative electrode material for lithium ion secondary batteries obtained in this Example.

Figure 12:
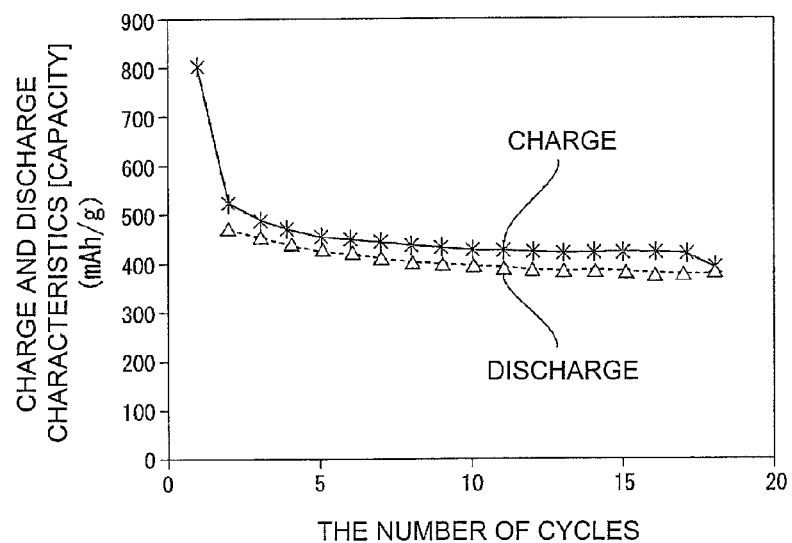
FIG. 12 is a diagram showing the charge and discharge characteristics of a lithium ion secondary battery obtained in Example 2.
Figure 13:
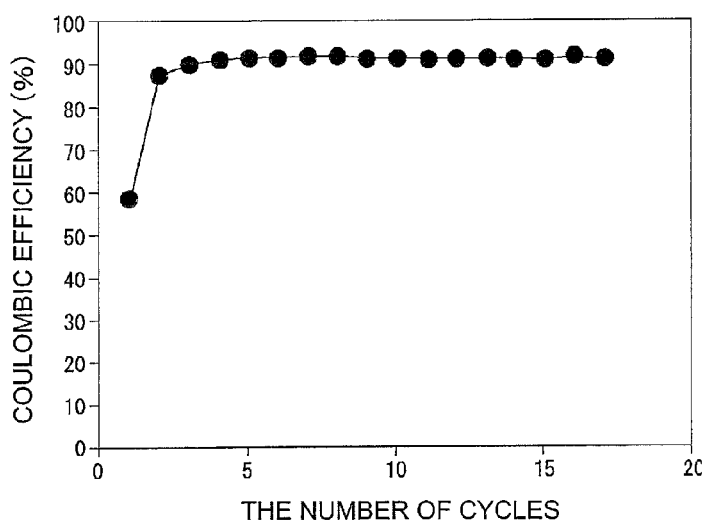
FIG. 13 is a diagram showing cycle characteristics in terms of coulombic efficiency for the lithium ion secondary battery obtained in Example 2.

FIGS. 12 and 13 are respective diagrams showing charge and discharge characteristics and life characteristics in terms of coulombic efficiency in which a coin type battery is used for evaluation of an assembled lithium ion secondary battery. It is seen that also in this Example, even if the charge and discharge cycle is repeated, the charge and discharge characteristics and coulombic efficiency do not deteriorate.

Example 3

Partially exfoliated graphite doped with Si particles was obtained as in Example 1 except that in obtaining partially exfoliated graphite doped with Si particles, ketjen black was not blended. A negative electrode material for lithium ion secondary batteries was obtained and evaluation was performed as in Example 1.

Figure 14:
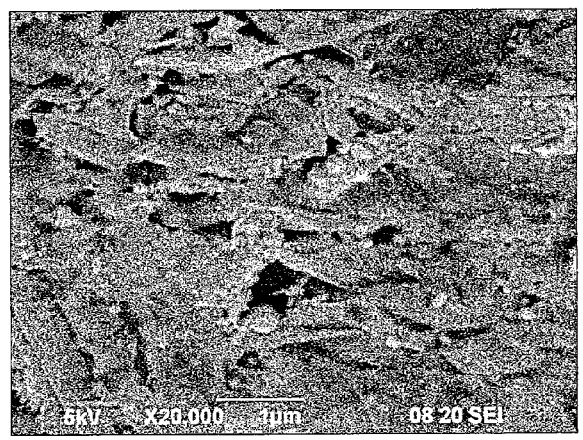
FIG. 14 is a scanning electron micrograph at 20000× magnification of a sheet-like negative electrode material for lithium ion secondary batteries obtained in Example 3.
Figure 15:
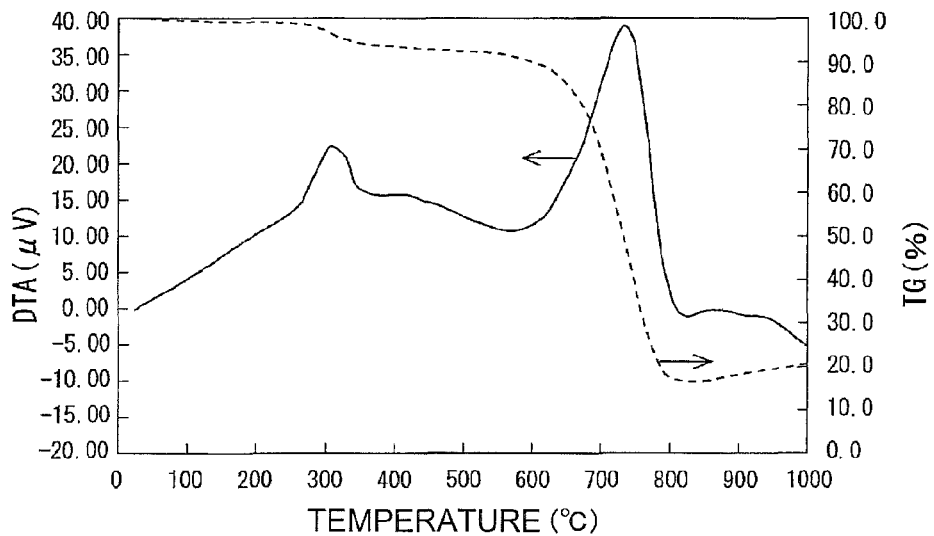
FIG. 15 is a diagram showing the TG/DTA measurement results of the sheet as a negative electrode material for lithium ion secondary batteries obtained in Example 3.

FIG. 14 is a scanning electron micrograph at 20000× magnification of the sheet-like negative electrode material for lithium ion secondary batteries obtained in this manner. FIG. 15 is a diagram showing the TG/DTA analysis results of the sheet-like negative electrode material for lithium ion secondary batteries.

As is clear from FIG. 14, it is seen that also in this Example, the space between the graphenes is doped with the Si particles. As is clear from FIG. 15, it is seen that also in this Example, an inflection point appears in the vicinity of 780° C. in the TG curve. It is seen that in the region of temperatures higher than this 780° C., the Si particles remain.

Figure 16:
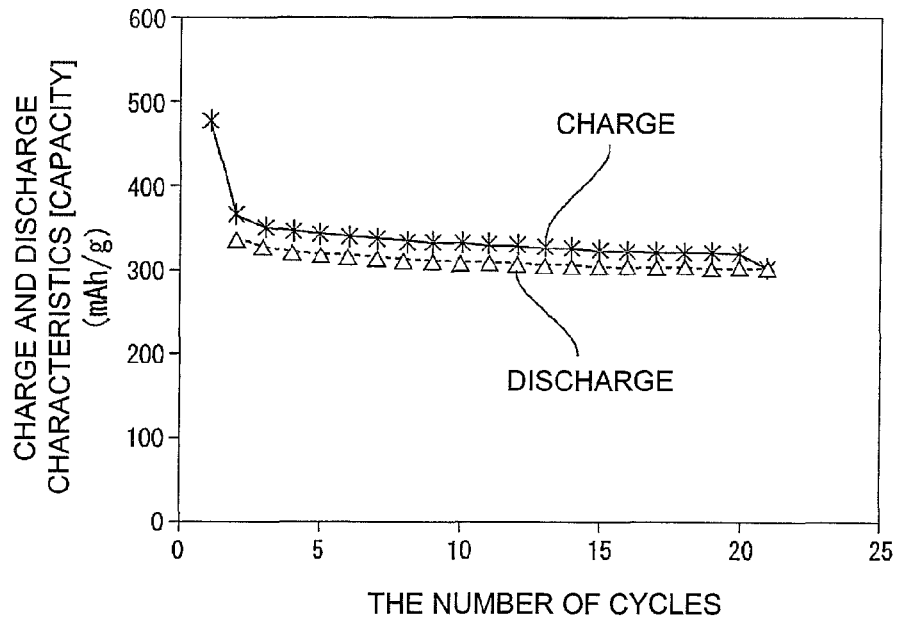
FIG. 16 is a diagram showing the charge and discharge characteristics of a lithium ion secondary battery obtained in Example 3.
Figure 17:
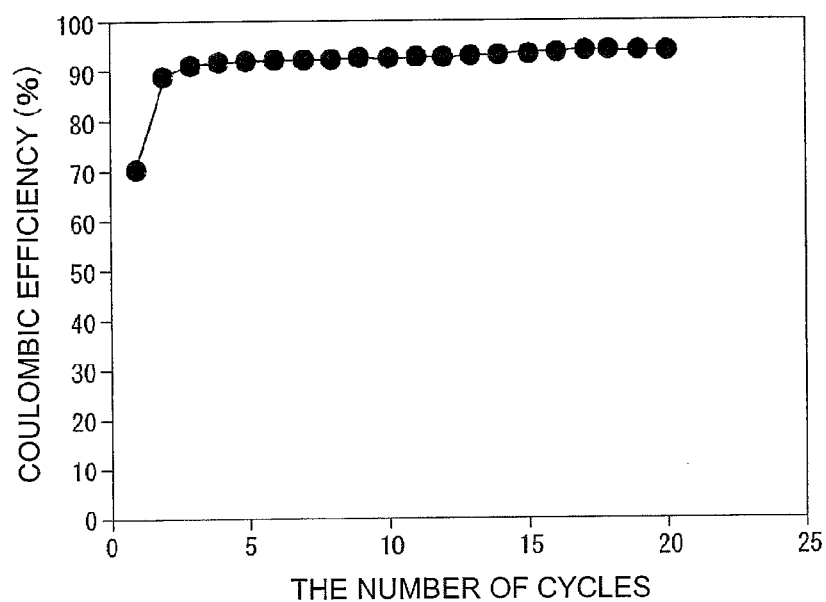
FIG. 17 is a diagram showing cycle characteristics in terms of coulombic efficiency for the lithium ion secondary battery obtained in Example 3.

FIG. 16 and FIG. 17 are diagrams showing charge and discharge test results. FIG. 16 is a diagram showing life characteristics in terms of charge and discharge characteristics, and FIG. 17 is a diagram showing life characteristics in terms of coulombic efficiency. As is clear from FIG. 16 and FIG. 17, it is seen that also in Example 3, even if the charge and discharge cycle is repeated, deterioration in charge and discharge characteristics and change in coulombic efficiency are less likely to occur.

Example 4

Partially exfoliated graphite doped with Si particles was obtained as in Example 3 except that tetrahydrofuran (THF) was used as the dispersion medium instead of ethanol. A sheet-like negative electrode material for lithium ion secondary batteries was obtained using the partially exfoliated graphite doped with Si particles. Subsequently, evaluation was performed as in Example 3.

Figure 18:
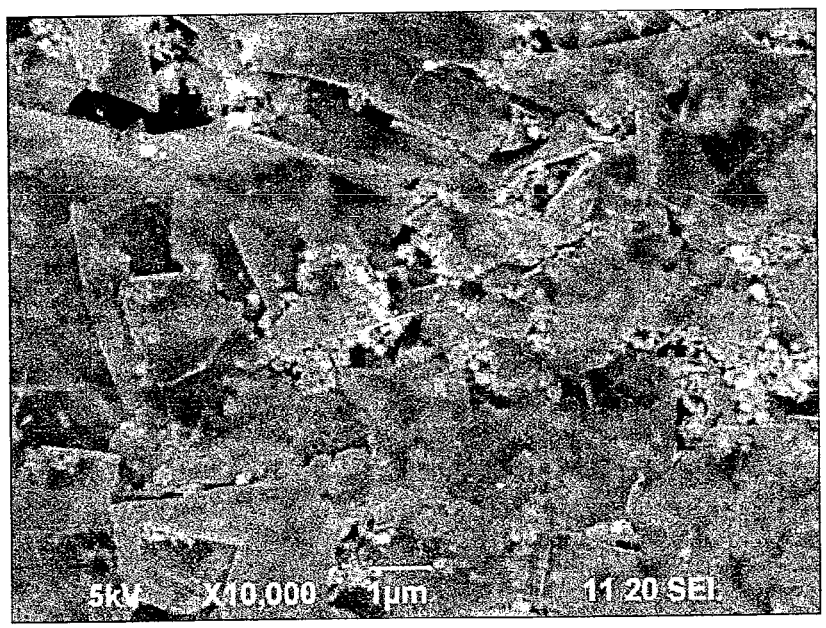
FIG. 18 is a scanning electron micrograph at 10000× magnification of a sheet-like negative electrode material for lithium ion secondary batteries obtained in Example 4.
Figure 19:
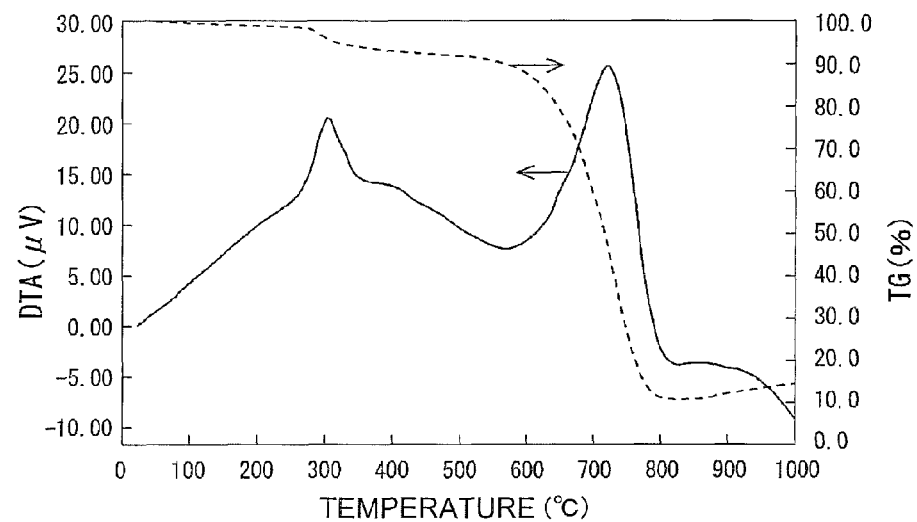
FIG. 19 is a diagram showing the TG/DTA measurement results of the negative electrode material for lithium ion secondary batteries obtained in Example 4.

FIG. 18 is a scanning electron micrograph at 10000× magnification of the sheet-like negative electrode material for lithium ion secondary batteries obtained in this manner. FIG. 19 is a diagram showing the TG/DTA analysis results of the sheet-like negative electrode material for lithium ion secondary batteries.

As is clear from FIG. 18, it is seen that also in this Example, the space between the graphenes is doped with the Si particles. As is clear from FIG. 19, also in this Example, an inflection point appears in the vicinity of 780° C. in the TG curve. It is seen that in the region of temperatures higher than this 780° C., the Si particles remain.

Figure 20:
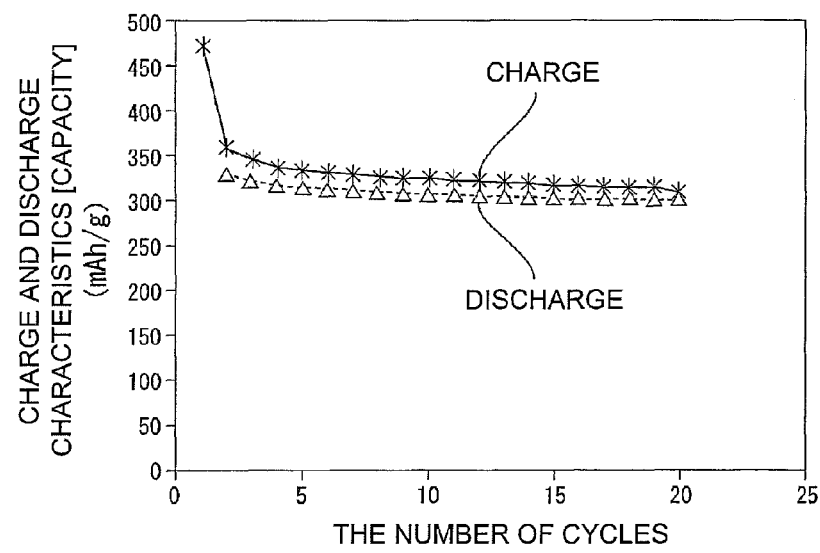
FIG. 20 is a diagram showing the charge and discharge characteristics of a lithium ion secondary battery obtained in Example 4.
Figure 21:
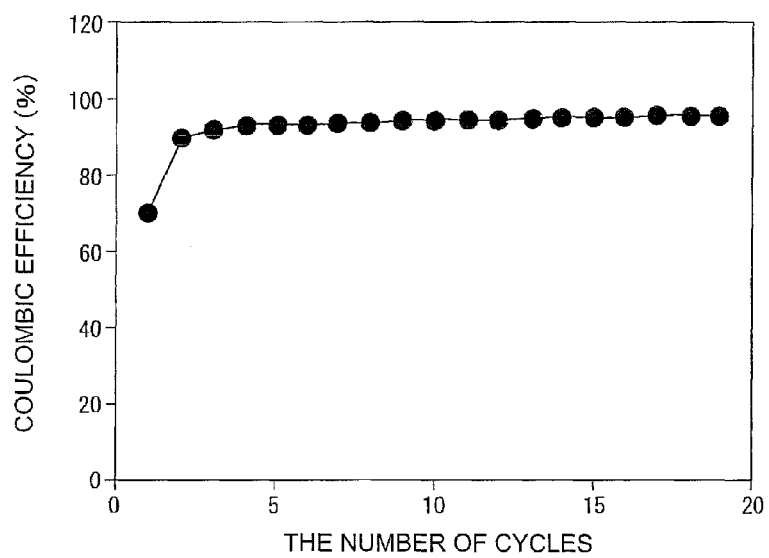
FIG. 21 is a diagram showing cycle characteristics in terms of coulombic efficiency for the lithium ion secondary battery obtained in Example 4.

FIG. 20 and FIG. 21 are diagrams showing charge and discharge test results. FIG. 21 is a diagram showing life characteristics in terms of charge and discharge characteristics, and FIG. 21 is a diagram showing life characteristics in terms of coulombic efficiency. As is clear from FIG. 20 and FIG. 21, it is seen that also in Example 4, even if the charge and discharge cycle is repeated, deterioration in charge and discharge characteristics and change in coulombic efficiency are less likely to occur.

Example 5

500 mg of the resin-retained partially exfoliated graphite obtained as described above and 500 mg of $TiO_2$ particles having an average particle diameter of 200 nm (manufactured by ISHIHARA SANGYO KAISHA, LTD., product name CR-90; rutile type titanium oxide) were introduced into 50 g of tetrahydrofuran as a dispersion solvent and dispersed. Next, the dispersion was irradiated with ultrasonic waves at 100 W and an oscillation frequency of 28 kHz for 1 hour using an ultrasonic treatment apparatus (manufactured by Honda Electronics Co., Ltd.). The $TiO_2$ particles were adsorbed on the partially exfoliated graphite by this ultrasonic treatment.

Thereafter, the composition treated as described above was maintained at a drying temperature of 80° C. for 1 hour, further at 110° C. for 1 hour, and further at 150° C. for 1 hour to remove the tetrahydrofuran as a dispersion medium. Further, the composition was heated at 500° C. for 2 hours. Thus, partially exfoliated graphite in which $TiO_2$ particles were included was obtained.

The XRD spectrum was measured for the partially exfoliated graphite in which $TiO_2$ particles were included obtained by subjecting the partially exfoliated graphite on which $TiO_2$ particles were adsorbed to heat treatment as described above. The result is shown by the solid line B in FIG. 23. For comparison, the XRD spectrum of the expanded graphite as raw material graphite is shown by the solid line A, the XRD spectrum of the $TiO_2$ particles is shown by the broken line C, the XRD spectrum of the partially exfoliated graphite is shown by the solid line E, and the XRD spectrum when the partially exfoliated graphite was heated at 500° C. for 2 hours is shown by the dashed-dotted line D.

Figure 23:
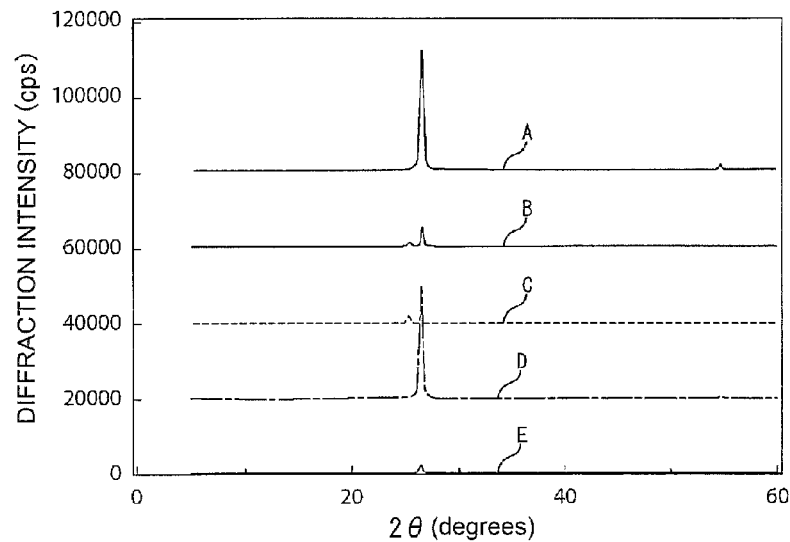
FIG. 23 is a diagram showing the XRD spectra of expanded graphite as raw material graphite, partially exfoliated graphite before and after heat treatment, $TiO_2$ particles, and partially exfoliated graphite in which $TiO_2$ particles are included used in Example 5.

From FIG. 23, in the dashed-dotted line D, the peak around 26° is larger than that for the partially exfoliated graphite, the solid line E. This is considered to be because the resin completely disappeared by the heat treatment at 500° C., and the graphene was stacked again. On the other hand, for the partially exfoliated graphite in which $TiO_2$ particles are included, the solid line B, the peak around 26° is not as large as that for the partially exfoliated graphite, the solid line D, by the heat treatment. In addition, a peak derived from the $TiO_2$ particles was observed around 25°. From these, it is seen that when the partially exfoliated graphite on which $TiO_2$ particles are adsorbed is subjected to heat treatment, the $TiO_2$ particles are inserted between the graphene layers instead of the resin, and the graphene is not restacked. Therefore, it was confirmed that resin-retained partially exfoliated graphite in which $TiO_2$ particles were included in partially exfoliated graphite was made.

Example 6

1000 mg of expanded graphite (manufactured by TOYO TANSO CO., LTD., trade name "PF Powder 8", BET specific surface area=22 m²/g), 2 g of ADCA having the structure represented by the above formula (1) (manufactured by EIWA CHEMICAL IND. CO., LTD, trade name "AC#R-K3", pyrolysis temperature 210° C.) as a pyrolyzable foaming agent, 10 g of a vinyl acetate polymer comprising a radical polymerizable monomer (manufactured by DENKA, product number: SN-04T), and 20 g of THF were mixed to provide a mixture.

Next, the above mixture was ultrasonically treated at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above vinyl acetate polymer was obtained. Next, the above composition was subjected to drying treatment at 80° C. for 2 hours and further heated to a temperature of 110° C. to completely dry the THF solution. The above composition was further maintained at a temperature of 230° C. for 2 hours. Thus, the above ADCA was pyrolyzed and foamed in the above composition. Then, the above composition was further heated to a temperature of 500° C. and maintained for 2 hours. Thus, the vinyl acetate polymer in the above composition was pyrolyzed to exfoliate the above graphite. In this manner, partially exfoliated graphite in which the vinyl acetate polymer remained as a resin was obtained. In other respects, partially exfoliated graphite doped with Si particles was obtained as in Example 1.

The XRD spectrum was measured for the partially exfoliated graphite doped with Si particles obtained by subjecting partially exfoliated graphite on which Si particles were adsorbed to heat treatment as described above. The result is shown by the solid line B in FIG. 24. For comparison, the XRD spectrum of the expanded graphite as raw material graphite is shown by the solid line A, the XRD spectrum of the Si particles is shown by the broken line C, the XRD spectrum of the partially exfoliated graphite is shown by the solid line E, and the XRD spectrum when the partially exfoliated graphite was heated at 500° C. for 2 hours is shown by the dashed-dotted line D.

Figure 24:
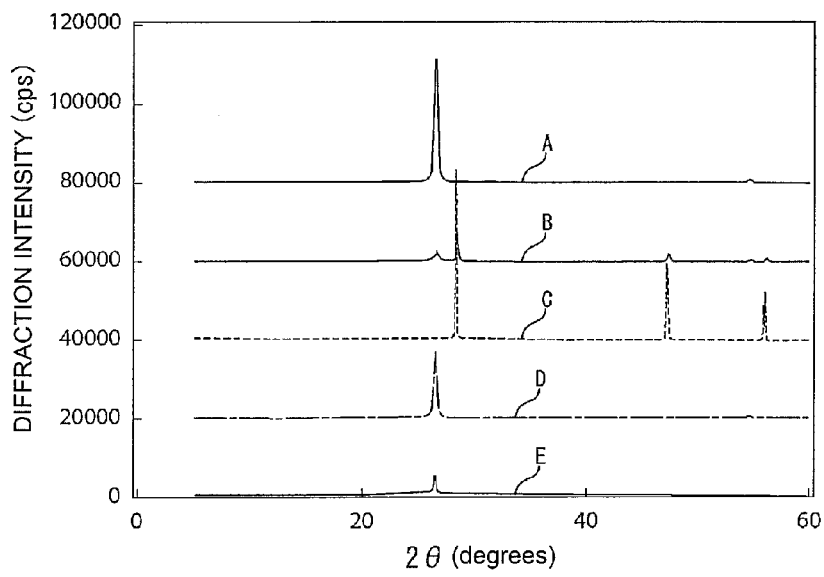
FIG. 24 is a diagram showing the XRD spectra of expanded graphite as raw material graphite, partially exfoliated graphite before and after heat treatment, Si particles, and partially exfoliated graphite doped with Si particles used in Example 6.

From FIG. 24, for the partially exfoliated graphite doped with Si particles, the solid line B, the peak around 26° is not as large as that for the partially exfoliated graphite, the solid line D, by the heat treatment. In addition, a peak derived from the Si particles was observed around 28°. From these, it is seen that when the partially exfoliated graphite on which Si particles are adsorbed is subjected to heat treatment, the Si particles are inserted between the graphene layers instead of the resin, and the graphene is not restacked. Therefore, it was confirmed that resin-retained partially exfoliated graphite in which partially exfoliated graphite was doped with Si particles was made.

Example 7

Partially exfoliated graphite in which $TiO_2$ particles were included was obtained as in Example 5 except that the partially exfoliated graphite used in Example 6 was used.

The XRD spectrum was measured for the partially exfoliated graphite doped with $TiO_2$ particles obtained by subjecting partially exfoliated graphite on which $TiO_2$ particles were adsorbed to heat treatment as described above. The result is shown by the solid line B in FIG. 25. For comparison, the XRD spectrum of the expanded graphite as raw material graphite is shown by the solid line A, the XRD spectrum of the $TiO_2$ particles is shown by the broken line C, the XRD spectrum of the partially exfoliated graphite is shown by the solid line E, and the XRD spectrum when the partially exfoliated graphite was heated at 500° C. for 2 hours is shown by the dashed-dotted line D.

Figure 25:
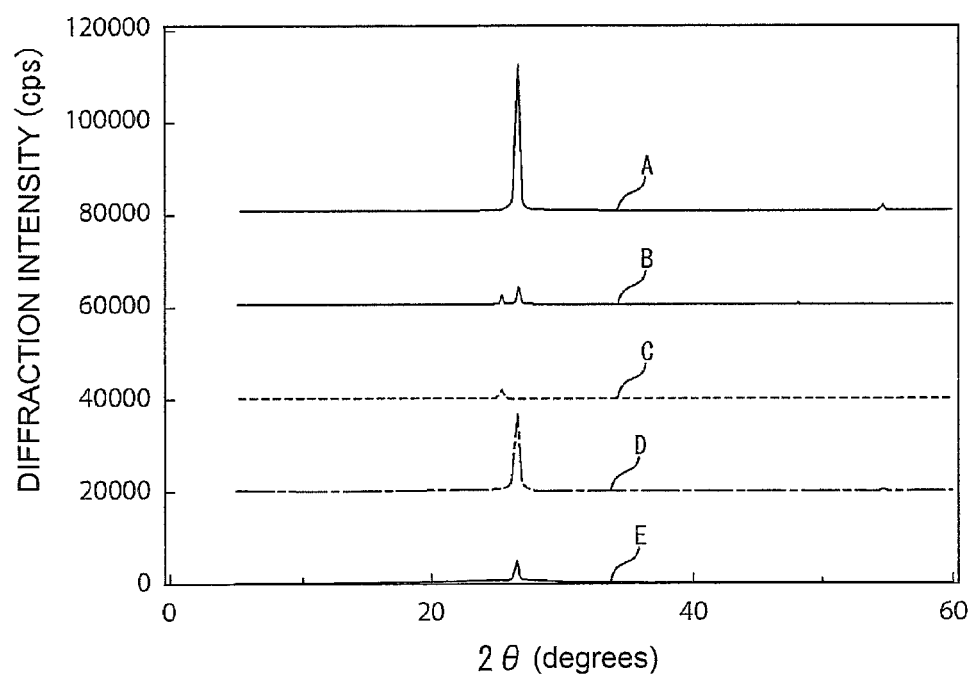
FIG. 25 is a diagram showing the XRD spectra of expanded graphite as raw material graphite, partially exfoliated graphite before and after heat treatment, $TiO_2$ particles, and partially exfoliated graphite in which $TiO_2$ particles are included used in Example 7.

From FIG. 25, for the partially exfoliated graphite in which $TiO_2$ particles are included, the solid line B, the peak around 26° is not as large as that for the partially exfoliated graphite, the solid line D, by the heat treatment. In addition, a peak derived from the $TiO_2$ particles was observed around 25°. From these, it is seen that when the partially exfoliated graphite on which $TiO_2$ particles are adsorbed is subjected to heat treatment, the $TiO_2$ particles are inserted between the graphene layers instead of the resin, and the graphene is not restacked. Therefore, it was confirmed that resin-retained partially exfoliated graphite in which $TiO_2$ particles were included in partially exfoliated graphite was made.

REFERENCE SIGNS LIST

1: counter electrode
2: working electrode
3: sheet
4: separator
5: metal lithium piece
6: jig
7: collecting electrode
8: spring

The invention claimed is:

1. A method for producing a fine particle-exfoliated graphite composite, comprising steps of:
    providing resin-retained partially exfoliated graphite having a structure in which graphene is partially exfoliated, obtained by pyrolyzing a resin in a composition in which the resin is fixed to graphite or primary exfoliated graphite, thereby exfoliating the graphite or primary exfoliated graphite while allowing part of the resin to remain; and
    heating a raw material composition comprising the partially exfoliated graphite and fine particles to include the fine particles in the partially exfoliated graphite to obtain a fine particle-exfoliated graphite composite.

2. The method for producing a fine particle-exfoliated graphite composite according to claim 1, wherein a pyrolysis temperature of the fine particles is higher than a pyrolysis temperature of the resin.

3. The method for producing a fine particle-exfoliated graphite composite according to claim 2, wherein the heating of the raw material composition is performed at a temperature higher than the pyrolysis temperature of the resin and lower than the pyrolysis temperature of the fine particles.

4. The method for producing a fine particle-exfoliated graphite composite according, to claim 1, wherein the fine particles are powdery.

5. The method for producing a fine particle-exfoliated graphite composite according to claim 1, wherein the fine particles are of an inorganic compound or a metal.

6. The method for producing a fine particle-exfoliated graphite composite according to claim 5, wherein the inorganic compound or metal is a material capable of intercalating and deintercalating lithium.

7. The method for producing a fine particle-exfoliated graphite composite according to claim 5, wherein the inorganic compound or metal is at least one selected from the group consisting of Co, Mn, Ni, P, Sn, Ge, Si, Ti, Zr, V, Al, and compounds thereof.

8. A method for producing a negative electrode material for lithium ion secondary batteries, comprising steps of:

obtaining a fine particle-exfoliated graphite composite by the method for producing a fine particle-exfoliated graphite composite according to claim 1;

providing a composition comprising the fine particle-exfoliated graphite composite, a binder resin, and a solvent; and shaping the composition.

9. The method for producing a negative electrode material for lithium ion secondary batteries according to claim 8, wherein the fine particles are Si particles, and the inclusion of the fine particles in the partially exfoliated graphite in the step of obtaining the fine particle-exfoliated graphite composite is performed by doping the partially exfoliated graphite with the Si particles.

10. The method for producing a negative electrode material for lithium ion secondary batteries according to claim 9, wherein in a step of doping with the Si particles, a composition comprising the partially exfoliated graphite and the Si particles is further mixed with a conductive doping promoter.

11. The method for producing a negative electrode material for lithium ion secondary batteries according to claim 10, Wherein at least one selected from the group consisting of ketjen black and acetylene black is used as the conductive doping promoter.

12. The method for producing a negative electrode material for lithium ion secondary batteries according to claim 8, wherein as the binder resin, at least one selected from the group consisting of styrene butadiene rubber, carboxymethyl cellulose, polyvinylidene fluoride, a polyimide resin, an acrylic resin, and a butyral resin is used.

13. A fine particle-exfoliated graphite composite, wherein fine particles are included in partially exfoliated graphite having a structure in which graphene is partially exfoliated.

14. The fine particle-exfoliated graphite composite according to claim 13, wherein the fine particles are Si particles, and the partially exfoliated graphite is doped with the fine particles.

15. A negative electrode material for lithium ion secondary batteries comprising the fine particle-exfoliated graphite composite according to claim 13 and a binder resin.

16. The negative electrode material for lithium ion secondary batteries according to claim 15 further comprising a conductive doping promoter.

17. The negative electrode material for lithium ion secondary batteries according to claim 15, wherein the binder resin is at least one selected from the group consisting of styrene butadiene rubber, carboxymethyl cellulose, polyvinylidene fluoride, a polyimide resin, an acrylic resin, and a butyral resin.

18. A lithium ion secondary battery comprising the negative electrode material for lithium ion secondary batteries according to claim 15 as a negative electrode.

19. The lithium ion secondary battery according to claim 18 comprising the negative electrode made from the negative electrode material for lithium ion secondary batteries, a positive electrode, and a separator disposed between the negative electrode and the positive electrode.

20. The lithium ion secondary battery according to claim 18, wherein the negative electrode has no metal foil and comprises the negative electrode material for lithium ion secondary batteries.

21. The lithium ion secondary battery according to claim 19, wherein the negative electrode is formed on one surface of the separator as a coating obtained by providing the negative electrode material for lithium ion secondary batteries on the one surface.

\* \* \* \* \*